(12) United States Patent
Bookbinder et al.

(10) Patent No.: US 9,772,445 B2
(45) Date of Patent: Sep. 26, 2017

(54) LOW ATTENUATION FIBER WITH STRESS RELIEVING LAYER AND A METHOD OF MAKING SUCH

(71) Applicant: Corning Incorporated, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/091,852

(22) Filed: Apr. 6, 2016

(65) Prior Publication Data
US 2016/0299289 A1     Oct. 13, 2016

Related U.S. Application Data

(60) Provisional application No. 62/143,929, filed on Apr. 7, 2015.

(51) Int. Cl.
*G02B 6/036*   (2006.01)
*G02B 6/02*    (2006.01)
(Continued)

(52) U.S. Cl.
CPC ..... *G02B 6/03694* (2013.01); *G02B 6/02395* (2013.01); *G02B 6/03644* (2013.01);
(Continued)

(58) Field of Classification Search
None
See application file for complete search history.

(56) References Cited

U.S. PATENT DOCUMENTS

| 5,090,979 A | 2/1992 | Le Sergent et al. |
| 6,917,740 B2 | 7/2005 | Boek |

(Continued)

FOREIGN PATENT DOCUMENTS

| CN | 101236273 | 8/2008 |
| CN | 103323908 | 9/2013 |

(Continued)

OTHER PUBLICATIONS

"Singe Mode Fiber Optics," Jeunhomme, pp. 39-44, Marcel Dekker, New York, 1990.
(Continued)

*Primary Examiner* — Jerry Rahll
(74) *Attorney, Agent, or Firm* — Svetlana Z. Short

(57) ABSTRACT

A single mode optical fiber having a core made from silica and less than or equal to about 11 weight % germania and having a maximum relative refractive index $\Delta_{1MAX}$. The optical fiber also has an inner cladding surrounding the core and having a minimum relative refractive index $\Delta_{2MIN}$, a first outer cladding surrounding the inner cladding and a second outer cladding surrounding the first outer cladding. The viscosity at 1650° C. of the second outer cladding minus the viscosity at 1650° C. of the first outer cladding is greater than $0.1e^7$ Poise, and $\Delta_{1MAX} > \Delta_{2MIN}$. The single mode optical fiber may also have an outer cladding surrounding the inner cladding made from silica or SiON. The first outer cladding has a maximum relative refractive index $\Delta_{3MAX}$, and $\Delta_{3MAX} > \Delta_{2MIN}$.

14 Claims, 6 Drawing Sheets

(51) Int. Cl.
  *C03B 37/027* (2006.01)
  *C03C 3/06* (2006.01)
  *C03C 3/076* (2006.01)
  *C03C 13/04* (2006.01)
  *C03B 37/018* (2006.01)
  *C03C 25/10* (2006.01)
  *G02B 6/028* (2006.01)

(52) U.S. Cl.
  CPC .......... *C03B 37/018* (2013.01); *C03B 37/027* (2013.01); *C03B 2201/20* (2013.01); *C03B 2201/24* (2013.01); *C03B 2201/31* (2013.01); *C03B 2203/222* (2013.01); *C03B 2203/23* (2013.01); *C03B 2203/24* (2013.01); *C03C 3/06* (2013.01); *C03C 3/076* (2013.01); *C03C 13/045* (2013.01); *C03C 13/046* (2013.01); *C03C 25/1055* (2013.01); *C03C 2201/11* (2013.01); *C03C 2201/24* (2013.01); *C03C 2201/31* (2013.01); *G02B 6/0281* (2013.01); *G02B 6/03627* (2013.01)

(56) References Cited

U.S. PATENT DOCUMENTS

| | | |
|---|---|---|
| 7,593,612 B2 | 9/2009 | Shimotakahara |
| 8,849,082 B2 | 9/2014 | Bookbinder et al. |
| 8,891,925 B2 | 11/2014 | Bickham et al. |
| 9,020,316 B2 | 4/2015 | Bookbinder et al. |
| 2004/0028362 A1* | 2/2004 | Otosaka ............ C03B 37/01211 385/123 |
| 2011/0058780 A1 | 3/2011 | Han et al. |

FOREIGN PATENT DOCUMENTS

| | | |
|---|---|---|
| CN | 103399376 | 11/2013 |
| EP | 1191367 A3 | 3/2002 |
| EP | 2562571 | 2/2013 |
| JP | 2002053344 | 2/2002 |
| WO | 2012084050 | 6/2012 |
| WO | 2015200191 | 12/2015 |

OTHER PUBLICATIONS

International Search Report and Written Opinion PCT/US2016/02632.5 dated Aug. 2, 2016.

* cited by examiner

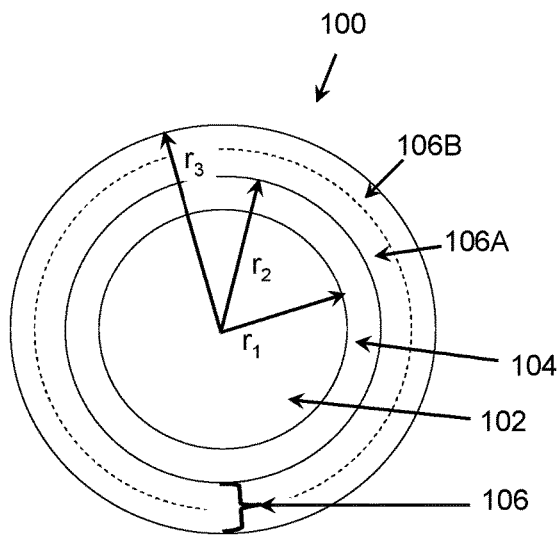
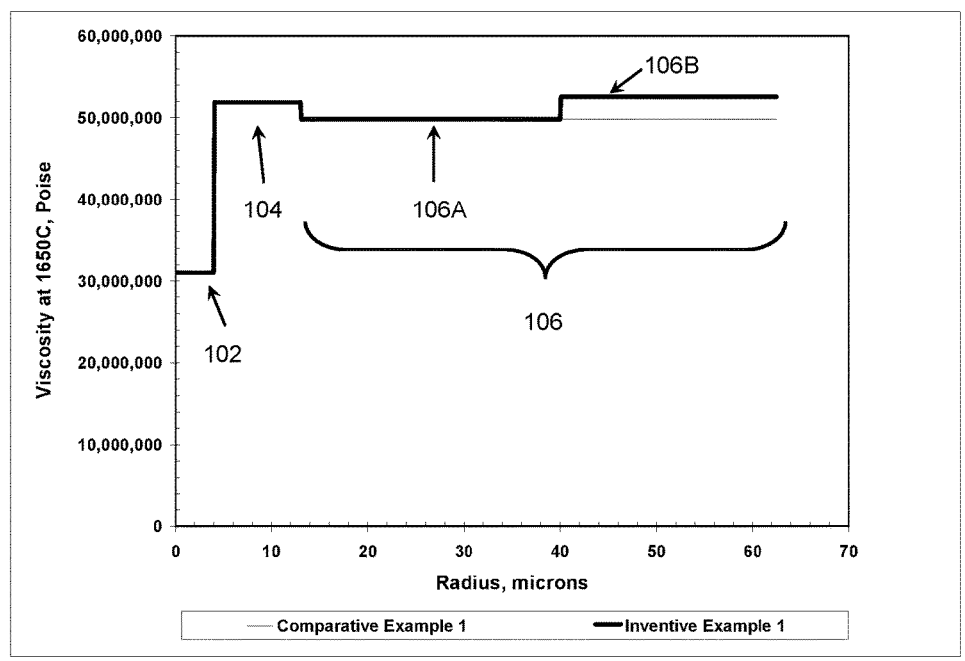
Figure 1A
Figure 1B

LOW ATTENUATION FIBER WITH STRESS RELIEVING LAYER AND A METHOD OF MAKING SUCH

This application claims the benefit of priority under 35 U.S.C. §119 of U.S. Provisional Application Ser. No. 62/143,929 filed on Apr. 7, 2015, the content of which is relied upon and incorporated herein by reference in its entirety.

BACKGROUND

Field

The present disclosure relates generally to optical fibers, and particularly to low attenuation optical fibers.

Technical Background

Glass optical fibers with low attenuation have recently been of significant interest in the telecommunications field. Techniques for improving attenuation properties can play important roles in many types of fibers, including transmission fibers used in long distance applications, multimode fibers used in the emerging area of fiber to the home applications, and dispersion compensation fibers where bending loss has limited many designs from practical use. In certain applications such as long distance applications, low attenuation is desired to deliver data accurately via light signals. Many of the proposed solutions for this problem involve significant modification of the fiber and its refractive index profile.

SUMMARY

According to one or more embodiments shown and described herein a single mode optical fiber has a core made from silica and less than or equal to about 11 weight % germania and has a maximum relative refractive index $\Delta_{1MAX}$. The optical fiber also has an inner cladding surrounding the core and having a relative refractive index $\Delta_2$ and an outer cladding. The outer cladding includes a first outer cladding portion surrounding the core and the inner cladding, and a second outer cladding portion surrounding the first outer cladding portion. The viscosity at 1650° C. of the second outer cladding portion minus the viscosity at 1650° C. of the first outer cladding portion is $\geq 1 \times 10^6$ Poise. In some embodiments the viscosity at 1650° C. of the second outer cladding portion minus the viscosity at 1650° C. of the first outer cladding portion is $\geq 5 \times 10^6$ Poise. In some embodiments the viscosity at 1650° C. of the second outer cladding portion minus the viscosity at 1650° C. of the first outer cladding portion is $\geq 0.1e^7$ Poise and $\leq 1.6e^8$ Poise.

According to one or more embodiments shown and described herein a single mode optical fiber has a core made from silica and less than or equal to about 11 weight % germania and has a maximum relative refractive index $\Delta_{1MAX}$. The optical fiber also has an inner cladding surrounding the core and having a relative refractive index $\Delta_2$ and an outer cladding. The outer cladding includes a first outer cladding portion surrounding the core and the inner cladding, and a second outer cladding portion surrounding the first outer cladding portion. The difference between the glass softening point of the second outer cladding portion and the glass softening point of the first outer cladding portion is greater than or equal to 2° C. In some embodiments the difference between the glass softening point of the second outer cladding portion and the glass softening point of the first outer cladding portion is greater than or equal to 3° C. (e.g., 3° C. to 100° C., for example 3° C. to 25° C.).

In some embodiments the difference between the glass softening point of the second outer cladding portion and the glass softening point of the first outer cladding portion is greater than or equal to 7° C., e.g., 7 to 100° C. In some embodiments the difference between the glass softening point of the second outer cladding portion and the glass softening point of the first outer cladding portion is 7° C., e.g., 7 to 20° C. According to some embodiments shown and described herein, the second portion of the outer cladding is made from silica or SiON. The first outer cladding portion has a maximum relative refractive index $\Delta_{3MAX}$, and $\Delta_{3MAX} > \Delta_2$ According to some embodiments the first outer cladding portion comprises chlorine doped silica, and has a relative refractive index $\Delta_{3A}$, and $\Delta_{3A} > \Delta_2$.

According to some embodiments the core has an outer radius of 3 microns to 10 microns, and the inner cladding has a radial thickness that is at least 5 microns.

According to some embodiments the first outer cladding portion comprises chlorine doped silica and has a relative refractive index $\Delta_{3A}$, and the second outer cladding portion comprises chlorine doped silica, silica or SiON.

According to some embodiments the second outer cladding portion comprises less chlorine than the first outer cladding portion.

According to some embodiments a method of drawing an optical fiber comprises:

(i) providing an optical fiber preform comprising: (a) a core comprising silica and less than or equal to about 11 weight % germania and having a maximum relative refractive index $\Delta_{1MAX}$; (b) an inner clad surrounding the core and having a minimum relative refractive index $\Delta_2$ and $\Delta_{1MAX} > \Delta_2$; (c) an outer clad surrounding the inner clad and comprising a first outer clad portion and a second outer clad portion surrounding the first out cladding portion; wherein the difference between the glass softening point of the second outer clad portion and the glass softening point of the first outer clad portion is at least 2° C.; and (ii) drawing the optical fiber from the preform.

According to some embodiments a method of drawing an optical fiber comprises:

(i) providing an optical fiber preform comprising: (a) a core comprising silica and less than or equal to about 11 weight % germania and having a maximum relative refractive index $\Delta_{1MAX}$; (b) an inner clad surrounding the core and having a minimum relative refractive index $\Delta_2$ and $\Delta_{1MAX} > \Delta_2$; (c) an outer clad surrounding the inner clad and comprising a first outer clad portion and a second outer clad portion surrounding the first outer clad portion; wherein the viscosity at 1650° C. of the second outer clad portion minus the viscosity at 1650° C. of the first outer clad portion is $\geq 0.1e^7$ Poise; and (ii) drawing the optical fiber from the preform.

According to some embodiments a method of drawing an optical fiber comprises:

(i) providing an optical fiber preform comprising: (a) a core comprising silica and less than or equal to about 11 weight % germania and having a maximum relative refractive index $\Delta_{1MAX}$; (b) an inner clad surrounding the core and having a minimum relative refractive index $\Delta_2$ and $\Delta_{1MAX} > \Delta_2$; (c) an outer clad surrounding the inner clad and comprising a first outer clad portion and a second outer clad portion surrounding the first out cladding portion; wherein the glass softening point of the second outer clad portion is at least 2° C. than the glass softening point of the first outer clad portion; and (ii) drawing the optical fiber from the preform.

Additional features and advantages of embodiments will be set forth in the detailed description which follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description serve to explain the principles and operations of embodiments.

BRIEF DESCRIPTION OF THE DRAWINGS

FIG. 1A is a schematic cross sectional view of an optical fiber according to one or more embodiments shown and described herein;

FIG. 1B graphically depicts viscosity at 1650° C. verses radius for an optical fiber according to one or more embodiments shown and described herein, and also and viscosity at 1650° C. verses radius for a comparative example optical fiber;

DETAILED DESCRIPTION

Figure 2A:
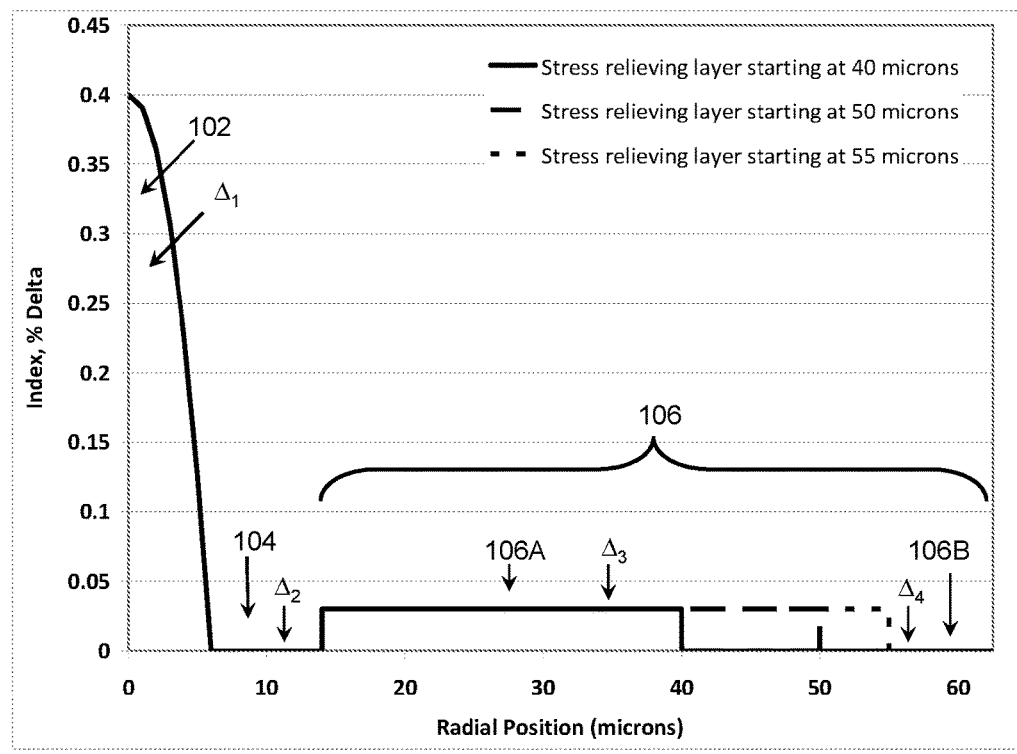
FIGS. 2A, 2B and 2C graphically depict index versus radius of several embodiments of the optical fiber depicted in FIG. 1A.
Figure 2B:
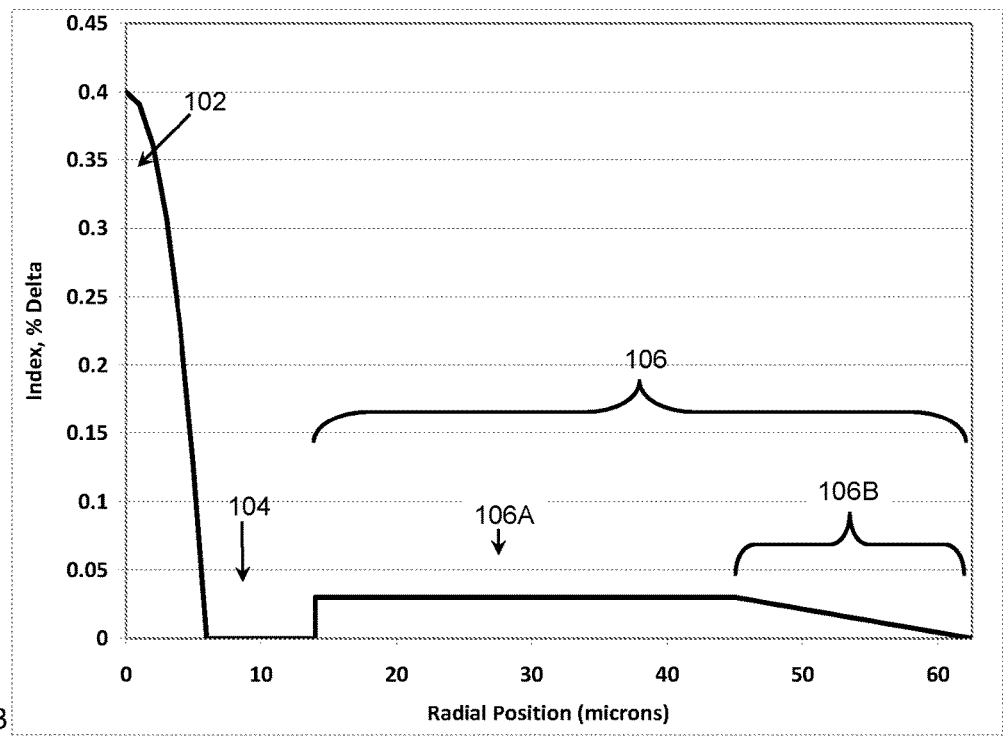
Figure 2C:
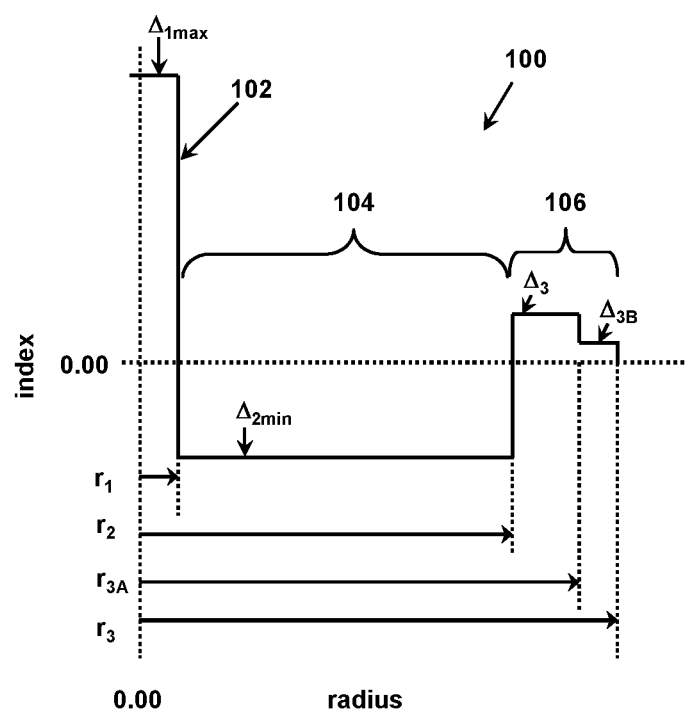

FIG. 1A schematically depicts a cross section of an optical fiber 100 according to one or more embodiments shown and described herein. Embodiments of optical fibers 100 described herein generally comprise a single mode optical fiber having a core 102 made from silica ($SiO_2$) and germania ($GeO_2$), with less than or equal to about 11 weight % germania. FIGS. 2A-2C graphically depict exemplary index profiles versus radius of several embodiments of the optical fiber 100 depicted in FIG. 1A. The fiber core 102 (also referred to herein as core layer and core portion) has a maximum relative refractive index $\Delta_{1MAX}$ (relative to silica). The optical fiber 100 also has an inner cladding 104 (also referred to herein as an inner cladding layer) surrounding the core 102 that has a relative refractive index $\Delta_2$, and $\Delta_{1MAX} > \Delta_2$. An outer cladding 106 surrounds the inner cladding 104. The outer cladding 106 (also referred to herein as outer clad) comprises two portions, a first outer cladding portion 106A (also referred to herein as first outer cladding layer) and a second outer cladding portion 106B (also referred to herein as second outer cladding layer or the second outer clad layer). The portion 106A of the outer cladding 106 is directly adjacent to the inner cladding 104 and has a relative refractive index $\Delta_{3A}$ where $\Delta_{1MAX} > \Delta_{3A} > \Delta_2$. The portion 106B of the outer cladding 106 surrounds the outer cladding portion 106A and is directly adjacent to the first outer cladding portion 106A. According to some fiber embodiments, the second outer cladding portion 106B has an average relative refractive index $\Delta_{3B}$, and $\Delta_{3A} > \Delta_{3B}$. According to some embodiments, $(\Delta_{3A} - \Delta_{3B}) \geq 0.02\%$. According to some embodiments, $(\Delta_{3A} - \Delta_{3B}) \geq 0.08\%$. According to some embodiments, $(\Delta_{3A} - \Delta_{3B}) \geq 0.14\%$. According to some embodiments, $0.2\% \geq (\Delta_{3A} - \Delta_{3B}) \geq 0.02\%$. According to some embodiments, $0.2\% \geq (\Delta_{3A} - \Delta_{3B}) \geq 0.05\%$. According to some other embodiments, $0.14\% \geq (\Delta_{3A} - \Delta_{3B}) \geq 0.05\%$. According to some other embodiments, $0.14\% \geq (\Delta_{3A} - \Delta_{3B}) \geq 0.08\%$. In some embodiments, the relative refractive index of inner cladding 104 is equal to the average relative index of second outer cladding layer (second outer cladding portion) 106B, and both layers 104 and 106B are comprised essentially of silica. As should be understood, composition of the glass layers (106A, 106B) determines the refractive index (index delta) of each layer. The outer most portion (or the second outer cladding portion 106B) of the cladding 106 is a stress relieving layer, and 1) reduces tensile stress placed on the inner cladding 104 and on the core 102, which results in lower fiber attenuation, while 2) enabling the fiber to have excellent bend performance (low macro-bend loss). In the disclosed embodiments, the second outer cladding portion 106B of the cladding 106 has a higher softening point than the softening point of the first outer cladding portion 106A of the cladding 106. As used herein, when referring to the softening point "difference" of the embodiments disclosed herein, the softening point of the second outer cladding portion 106B of the cladding 106 is higher than the softening point of the first outer cladding portion 106A of the cladding 106. According to some of the embodiments described herein, difference between the glass softening point ($T_{soft} = T_{soft-2} = T_{S106B}$) of the second outer cladding portion 106B and the glass softening point ($T_{soft} = T_{soft-1} = T_{S106A}$) of the first outer cladding portion 106A is greater than or equal to about 2° C. (i.e. $T_{S106B} - T_{S106A} \geq 2°$ C., for example, in some embodiments 150° C. $> T_{S106B} - T_{S106A} \geq 2°$ C., and preferably 100° C. $> T_{S106B} - T_{S106A} \geq 2°$ C.). In some other embodiments described herein, the difference between the glass softening point of the second outer cladding portion 106B and the glass softening point of the first outer cladding portion 106A is greater than or equal to about 3° C. (i.e., $T_{S106B} - T_{S106A} \geq 3°$ C. (for example, in some embodiments 100° C. $> T_{S106B} - T_{S106A} \geq 3°$ C.)). In some other embodiments described herein, the difference between the glass softening point (temperature $T_{soft}$) of the second outer cladding portion 106B ($T_{soft} = T_{S106B}$) and the glass softening point (temperature $T_{soft}$) of the first outer cladding portion 106A (i.e., $T_{soft} = T_{S106A}$) is greater than or equal to about 7° C. (i.e. $T_{S106B} - T_{S106A} \geq 7°$ C., and for example, in some embodiments 100° C. $> T_{S106B} - T_{S106A} \geq 7°$ C.). In some embodiments 50° C. $> T_{S106B} - T_{S106A} \geq 7°$ C.). The softening points of these two layers 106A and 106B relate to the glass viscosity of these layers. As should be understood, the softening point of the outer cladding portions 106A and 106B is the temperature $T_{soft}$ where the glass composition has a viscosity of $10^{7.6}$ Poise.

Figure 2D:
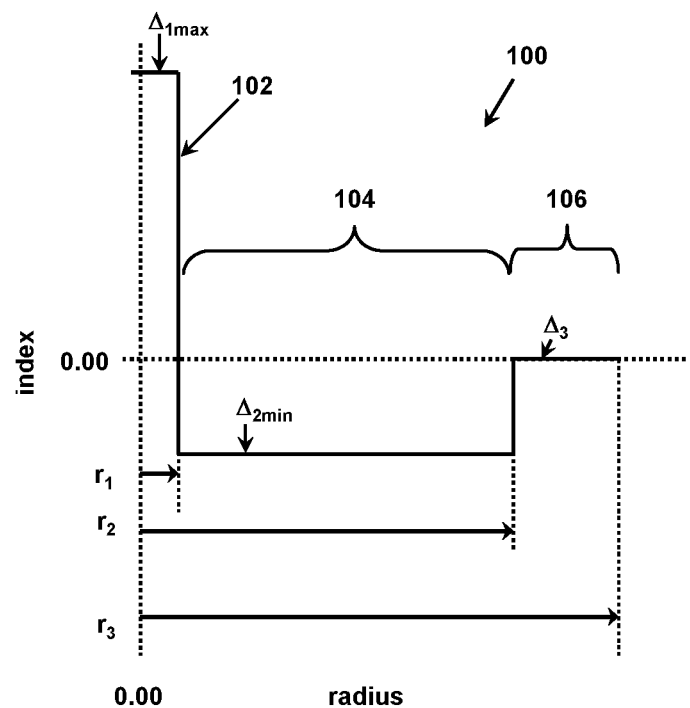
FIG. 2D graphically depicts index versus radius of a typical commercial fiber.

A typical profile of a long haul transmission commercial fiber is shown in FIG. 2D (comparative fiber example). This comparative example fiber comprises a germania ($GeO_2$) doped core, surrounded by an inner cladding layer that is comprised essentially of pure silica, and a silica based single layer outer cladding that is uniformly updoped to increase the refractive index of the outer cladding relative to the inner cladding. The updoped outer cladding in such a commercial optical fiber is typically achieved by doping the outer cladding with updopants such as chlorine (using dopant precursors such as chlorine, $SiCl_4$, etc.), germania, or alumina. Applicants discovered that the dopants used in the outer cladding layer of commercial optical fibers result in lowering the viscosity of the outer cladding layer compared to that of the inner cladding layer, making the stiff inner cladding carry the maximum stress induced during drawing of such comparative optical fibers. The increased tensile load in the inner cladding of such commercial fibers results in a negative impact on the structural relaxation the glass undergoes during the fiber draw, and thereby increases the resultant optical fiber attenuation. More specifically, without being bound by theory, applicants believe, that in such commercial fibers, because of the softer outer cladding compared to the inner cladding, stresses induced at the draw causes inner cladding to be in tension compared to the core and the outer cladding, which results in higher fiber attenuation.

In contrast, in order to reduce the stress in the inner cladding 104, applicants utilized the outer cladding 106 with a stiff stress relieving layer (second outer cladding portion 106B) as the outermost portion of the outer cladding 106 of the optical fiber 100. According to the embodiments disclosed herein, the first outer cladding portion 106A has a lower viscosity than that of the inner cladding 104, but the second outer cladding portion 106B (the stress relieving layer) has a higher viscosity than that of the first outer cladding portion 106A. Preferably, the viscosity of second outer cladding portion 106B is also equal or higher than the viscosity of the inner cladding 104. For example, in one embodiment, the outer cladding portion 106B of the outer cladding is not doped (i.e., it is pure silica or essentially pure silica) and is a stress relieving layer of the fiber. In another embodiment, the second outer cladding portion 106B has a lower average updopant(s) amount than the first outer portion 106A. In some embodiments, the portion of 106B is preferably stiffer than the core 102 or inner cladding 104 of the optical fibers 100.

As used herein, an updopant is a material or dopant that increases the refractive index of the glass relative to pure silica. Such updopants may be, for example, chlorine, germania, N, phosphorous, titania or alumina.

As used herein, a downdopant is a material or dopant that decreases the refractive index of the glass relative to pure silica. Such downdopants may be F (fluorine), or $B_2O_3$.

The "refractive index profile," as used herein, is the relationship between refractive index or relative refractive index and fiber radius of a radial cross section of the optical fiber.

"Relative refractive index," as used herein, is defined as:

$$\Delta_i \% = 100 \times \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass. The terms delta, delta index, delta index percent, Δ, Δ % are used interchangeably herein.

More specifically, as used herein, $\Delta_{1MAX}$ refers to the maximum relative refractive index of a core of the optical fiber, $\Delta_{2MIN}$ refers to the minimum relative refractive index of the inner cladding of the optical fiber, and $\Delta_{3MAX}$ refers to the maximum relative refractive index of the first outer cladding portion 106A of the optical fiber. The relative refractive indices are given in percentages based from the refractive index of pure silica glass.

It should be understood that the phrase "pure silica glass," as used herein, means that the region or layer of the optical fiber comprising "pure silica glass" does not contain material, such as dopants and/or other trace materials, in an amount which would significantly alter the refractive index of the silica glass region or portion. However, small amounts of dopants (e.g., chlorine and/or fluorine in an amount less than 1500 ppm of each) may be present in the region or portion of the fiber that is referred to as being "silica" or "pure silica."

"Chromatic dispersion" (which may be referred to herein as "dispersion" unless otherwise noted) of a waveguide fiber is the sum of the material dispersion and the waveguide dispersion. A zero dispersion wavelength is a wavelength at which the dispersion has a value of zero and also referred to herein as Lambda 0 or $\lambda_0$. Dispersion slope is the rate of change of dispersion with respect to wavelength.

"Effective area" is defined in equation 1 as:

$$A_{eff} = 2\pi (\smallint f^2 r dr)^2 / (\smallint f^4 r dr) \quad \text{(Eq. 1)}$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" (also referred to herein as alpha profile or just alpha) refers to a relative refractive index profile of the core region expressed in terms of Δ(r) which is in units of "%", where r is radius. Δr is represented by equation 2, $$\Delta(r) = \Delta(r_o)(1-[|r-r_o|/(r_1-r_o)]^\alpha) \quad \text{(Eq. 2)}$$

where $r_o$ is the point at which Δ(r) is maximum, $r_1$ is the point at which Δ(r) is zero, and r is in the range $r_i < r < r_f$, where Δ is defined above, $r_i$ is the initial point of the α-profile, $r_f$ is the final point of the α-profile, and α is an exponent which is a real number.

The mode field diameter (MFD) is measured using the Peterman II method as shown in equations 3 and 4, respectively wherein, $$2w = MFD \quad \text{(Eq. 3)}$$

and $$w^2 = (2\smallint f^2 r dr / \smallint [df/dr]^2 r dr) \quad \text{(Eq. 4)}$$

wherein the integral limits are 0 to ∞.

The bend resistance of a waveguide fiber can be gauged by induced attenuation under prescribed test conditions, such as by deploying or wrapping the fiber around a mandrel having a prescribed diameter, e.g., by wrapping 1 turn around either a 6 mm, 10 mm, 20 mm, 30 mm or similar diameter mandrel (e.g. "1×10 mm diameter macrobend loss" or the "1×30 mm diameter macrobend loss") and measuring the increase in attenuation per turn.

One type of bend test is the lateral load microbend test. In a so-called "lateral load wire mesh" test (LLWM), a prescribed length of waveguide fiber is placed between two flat plates. A #70 wire mesh is attached to one of the plates. A known length of waveguide fiber is sandwiched between the plates, and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. In embodiments, the pin array is a set of ten cylindrical pins arranged in a single row and held in a fixed vertical position on a flat surface. The pin spacing is 5 mm, center to center, and the pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, "theoretical fiber cutoff", or "theoretical cutoff" for a given mode is the wavelength above which guided light cannot propagate in that mode. A mathematical definition can be found in "Single Mode Fiber Optics," Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength," also known as the "2 m fiber cutoff" or "measured cutoff" The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

The term softening point, is defined as the temperature at which the glass has a viscosity of $10^{7.6}$ Poise (1 Poise (P)=0.1 Pascal second (Pa·s)).

The viscosity (at 1650° C.) of each fiber layer times the area of that layer in is calculated and reported in Poise·microns$^2$.

The normalized stress relieving parameter $\Phi$ is a non-dimensional parameter that is proportional to the stress carrying ability of the stress relieving layer of the fiber and is calculated as follows:

$$\Phi = 1000 \cdot (\Omega - \Psi) \quad \text{(Eq. 5)}$$

where dimensionless parameters $\Omega$ and $\Psi$ are calculated as outlined below.

Parameter $\Omega$ is defined as the viscosity multiplied by the area of the second outer-cladding layer 106B ($\eta_{2OC} A_{106B}$) normalized to the viscosity multiplied by the area of entire fiber ($\eta_{fiber} A_{fiber}$), and is calculated as shown in Equation 6:

$$\Omega = \int_{r3A}^{r3} \eta_{2OC}(r) r \, dr \Big/ \left( \int_{r3A}^{r3} \eta_{2OC}(r) r \, dr + \int_{r2}^{r3A} \eta_{1OC}(r) r \, dr + \int_{r1}^{r2} \eta_{IC}(r) r \, dr + \int_{0}^{r1} \eta_{core}(r) r \, dr \right) \quad \text{(Eq. 6)}$$

where $\eta_{core}, \eta_{IC}, \eta_{1OC}, \eta_{2OC}$ are the viscosities (at 1650° C.) of the core, inner cladding, first outer cladding portion 106A and second outer cladding portion 106B of the outer cladding 106, respectively. This equation can be reduced to a general form shown in Eq. 6.1

$$\Omega = \int_{r3A}^{r3} \eta(r) r \, dr \Big/ \left( \int_{0}^{r3} \eta(r) r \, dr \right) \quad \text{(Eq. 6.1)}$$

In Eq. 6, (and Eq. 6.1) parameters $r_0$, $r_1$, $r_2$, $r_{3A}$ and $r_3$ are the radial locations of the center of the fiber, the outer radius of the core 102, the outer radius of the inner cladding 104, the outer radius of the first outer cladding portion 106A and the outer radius of the second outer cladding portion 106B, respectively.

The Parameter $\Psi$ in Eq. 5 is the stress relieving area of the stress relieving fiber layer (i.e., the area of the second outer cladding layer 106B) normalized to the area of entire fiber and is calculated using Equation 7:

$$\Psi = \int_{r3A}^{r3} r \, dr \Big/ \left( \int_{0}^{r3} r \, dr \right) \quad \text{(Eq. 7)}$$

In Eqs. 5-7, the local viscosity at any radial location of the fiber is estimated as a function of local glass composition for the given fiber layer and, for example, is given by the following relation:

$$\eta(\text{in Poise}) = 10^{\wedge}[\log [\eta_0] - 0.0319[GeO_2] - 0.058[Cl] - 0.4424[F] + 3.02[N]] \quad \text{[Eq. 8]}$$

where log is the logarithm in base 10, [GeO2], [Cl], [F] and [SiON] are the local weight % of germania, chlorine, fluorine and SiON dopants, respectively, and $\eta_0$ is the viscosity of pure silica (i.e., silica glass with no dopants) and is given in Equation 9 as:

$$\eta_0(\text{in Poise}) = \text{Exp}\left[-13.738 + \left(\frac{60604.7}{T}\right)\right] \quad \text{[Eq. 9]}$$

and where T is the temperature in degrees Kelvin, K. The above relation for viscosity has been used to calculate the softening point ($T_{soft}$) in degrees Celsius, C., of the glass as a function of glass composition as shown in Equation 10 as:

$$T_{soft}(C) = \frac{60604.7}{\left\{ \ln[10^{\wedge}(7.6 + 0.0319[GeO_2] + 0.058[Cl] + 0.4424[F] - 3.02[N])] + 13.738 \right\}} - 273 \quad \text{[Eq. 10]}$$

where ln is the natural logarithm. The viscosity and softening point of each layer in an optical fiber is calculated using these equations. Examples are shown below.

Referring to FIGS. 1A and 1B and FIGS. 2A-2C, a cross section of an optical fiber 100 is shown according to embodiments described herein. The optical fiber 100 generally comprises a glass core 102 with an inner cladding 104 surrounding the core 102. The outer cladding 106 surrounds the inner cladding 104. The core 102, the inner cladding 104, and the outer cladding 106 may comprise silica, specifically silica-based glass. The core 102 and the inner cladding 104 may comprise dopants, as described in more detail herein. The cross section of the optical fiber 100 may be generally circular-symmetric with respect to the center of the core 102 and the core 102 may have a radius $r_1$. The inner cladding 104 surrounds the core 102 and extends from the radius $r_1$ to the radius $r_2$ such that the inner cladding has a radial thickness $T_2=r_2-r_1$. The outer cladding 106 surrounds the inner cladding 104 and extends from the radius $r_2$ to the radius $r_3$ such that the outer cladding has a radial thickness $T_3=r_3-r_2$. Accordingly, the optical fiber 100 (e.g., the core 102, inner cladding 104 and outer cladding 106) may have an outer diameter $2r_3$. The first outer cladding portion 106A is directly adjacent to the inner cladding 104 and extends from the radius $r_2$ to the radius $r_{3A}$. The second outer cladding portion 106B surrounds the first outer cladding portion 106A and extends from the radius $r_{3A}$ to the outer radius $r_3$.

As described herein, the core 102 of the optical fiber 100 has a radius $r_1$ and a radial thickness $T_1=r_1$. In some embodiments, the optical fiber 100 is a single-mode optical fiber. The core 102 may have a radial thickness of greater than or equal to about 3.0 microns, such as greater than or equal to about 4.0 microns. The core may have a radial thickness less than or equal to about 10 microns, such as less than or equal to about 7.0 microns. Accordingly, in some embodiments, the radial thickness $T_1$ may be from greater than or equal to about 3.0 microns to less than or equal to about 8.0 microns, such as from greater than or equal to about 4.0 microns to less than or equal to about 7.0 microns (e.g. 4.5-6 microns). In other embodiments, the radial thickness $T_1$ may be about 5.0 microns. However, it should be understood that the core 102 may have different dimensions to facilitate various other single-mode embodiments.

In some embodiments, the core 102 comprises silica glass ($SiO_2$) and one or more index of refraction raising dopants (referred to herein as "updopants") such as, for example, $GeO_2$, $Cl$, $Al_2O_3$, $P_2O_5$, $TiO_2$, $ZrO_2$, $Nb_2O_5$ and/or $Ta_2O_5$.

In some embodiments, the core 102 is updoped with $GeO_2$. For example, the core 102 may be updoped with less than or equal to about 11 weight % $GeO_2$, such as less than or equal to about 9.0 weight % $GeO_2$. The core 102 may be updoped with less than or equal to about 8.5 weight % $GeO_2$. In embodiments, the core 102 may be up-doped with greater than or equal to about 2.0 weight % $GeO_2$, such as greater than or equal to about 2.5 weight % $GeO_2$. In embodiments, the core 102 may be up-doped with greater than or equal to about 3.0 weight % $GeO_2$, such as greater than or equal to about 3.5 weight % $GeO_2$. Accordingly, in some embodiments, the core 102 may comprise from greater than or equal to about 2.0 weight % to less than or equal to about 9.5 weight % $GeO_2$, or from greater than or equal to about 2.5 weight % to less than or equal to about 8.0 weight % $GeO_2$.

In embodiments where the core 102 is updoped, the maximum relative refractive index $\Delta_{1MAX}$ of the core 102 may be greater than or equal to about 0.2%, such as greater than or equal to about 0.23% or 0.25%. In some embodiments, the maximum relative refractive index $\Delta_{1MAX}$ may be greater than or equal to about 0.30%, such as greater than or equal to about 0.35%. In some embodiments, the maximum relative refractive index $\Delta_{1MAX}$ may be less than or equal to about 0.5%, such as less than or equal to about 0.45%. Accordingly, in some embodiments, the maximum relative refractive index $\Delta_{1MAX}$ may be from greater than or equal to about 0.23% to less than or equal to about 0.45%. In some embodiments, the maximum relative refractive index $\Delta_{1MAX}$ may be less than or equal to about 0.4%. In some embodiments, the core 102 has a relative refractive index profile with profile parameter a having values larger than 5. In some other embodiments, the core 102 has a relative refractive index profile with profile parameter α ranging between 1.5 and 5.

As described herein above, the optical fiber 100 may further comprise an inner cladding 104. In some embodiments, the inner cladding 104 has a radial thickness $T_2=r_2-r_1$. The radial thickness $T_2$ of the inner cladding 104 may depend on the desired dimensions of the core 102 and the desired dimensions and properties of the other glass portion(s) of the optical fiber 100. In some exemplary embodiments, the inner cladding may have a radial thickness of greater than or equal to about 5 microns, such as greater than or equal to about 7 or 10 microns. Accordingly, in some embodiments, the inner cladding 104 may have a radial thickness from greater than or equal to about 5 microns to less than or equal to about 25 microns, such as from greater than or equal to about 6 microns to less than or equal to about 20 microns.

In some exemplary embodiments, the inner cladding 104 of fiber 100 is comprises essentially of silica. That is, in these embodiments, the inner cladding 104 is comprised primarily of silica, with trace dopant levels (e.g., chlorine, fluorine, etc.) having concentrations less than 1500 ppm.

In some embodiments, the inner cladding's relative refractive index $\Delta_2$ is between 0.02% and 0.04% Δ. For example, the inner cladding 104 may have a minimum relative reflective index $\Delta_2$ of between 0 and 0.02% Δ (relative to pure silica), such as between 0% and 0.015% Δ.

As described herein above, and shown in FIGS. 1A, 1B and 2A-2C, the optical fiber 100 also comprises an outer cladding 106. The outer cladding 106 has a radial thickness $T_3=r_3-r_2$. In some embodiments, the radial thickness $T_3$ of the outer cladding 106 may be less than or equal to about 55 microns, such as less than or equal to about 50 microns. In some embodiments, the radial thickness $T_3$ of the outer cladding 106 may be less than or equal to about 45 microns, for example, less than or equal to about 40 microns. In some embodiments, the inner portion of the outer cladding (i.e., the first outer cladding portion 106A) is updoped with chlorine, having chlorine weight % ranging between 2000 ppm and 20000 ppm. The relative refractive index of the first outer cladding portion 106A is between 0.02% and 0.2% Δ.

In some embodiments, the second (or the outermost) outer cladding portion 106B of the cladding 106 comprises pure silica glass. Therefore, in these embodiments the average relative refractive index $\Delta_{3B}$ of the outer cladding is about 0.0% because, as stated herein, the relative refractive index is measured relative to the refractive index of pure silica glass. Additionally, according to some embodiments the second outer cladding portion 106B will be stiff i.e., will have higher viscosity (compared to the core 102, inner cladding 104, and the first portion 106A of the outer cladding 106), because it is not updoped, or is up doped less than the first outer cladding portion 106A.

For example, FIG. 2A illustrates three different fiber profiles where the first outer cladding portion 106A is updoped with chlorine (chlorine doped silica) starting at 14 microns and ending at three different radial positions (40 microns, 50 microns and 55 microns), followed by a silica based layer (corresponding to the second outer cladding portion 106B) that is either lower in dopant concentration (as compared to the updoped first outer cladding portion 106A) or is free of dopants. Thus, the second outer cladding portion 106B in these fibers is higher in viscosity than the updoped first outer cladding portion 106A. In addition, of these optical fibers the outermost or the second outer cladding portion 106B of the outer cladding 106 is stiffer than the first outer cladding portion 106A. As the thickness of the outer tension bearing stiff second outer cladding portion 106B increases, the stress in the inner cladding 104 is reduced (See FIG. 4A).

In some other embodiments, the second outer cladding portion 106B of the cladding 106 comprises SiON. Therefore, in these embodiments the maximum relative refractive index $\Delta_{3B}$ of the second outer cladding portion 106B is higher than that of pure silica because, N (nitrogen) raises the refractive index of silica. Additionally, the second outer cladding portion 106B of these embodiments will be stiff (higher viscosity) compared to the core 102, the inner cladding 104, and the first outer cladding portion 106A, because SiON doped glass has viscosity that is higher than that of pure silica.

Further, according to some embodiments, the concentration of updopants in the outer cladding portions 106A and 106B may be adjusted relative to one another to have the glass viscosity of the first outer cladding portion 106A lower than that of second outer cladding portion 106B.

FIG. 1B graphically depicts viscosity at 1650° C. verses radius for an optical fiber according to one or more embodiments shown and described herein (thick line) and that of comparative example optical fiber (thin line). The viscosity curves of both fibers of FIG. 1B are similar up to the radial distance of about 40 microns. However, the conventional fiber does not have a raised region 106B shown in the embodiments of the fibers disclosed herein. The viscosity of outer cladding 106 in conventional long haul fibers is generally uniform, because the typical outer cladding in a conventional long haul fiber is made of the same material (i.e., it has uniform composition). Applicants discovered that having higher viscosity of the outer most or second outer cladding portion 106B compared to first outer cladding portion 106A results in an unexpected advantage, i.e., it results in the decrease of attenuation of light traveling within the core 102 of the optical fiber 100. The differences in viscosities of the cladding portion 106B and the viscosity of the first outer cladding portion 106A may be assessed by the difference between the softening point of the first outer cladding portion 106A and the softening point of the outmost cladding layer (e.g., the second outer cladding portion 106B). As should be understood, the softening point $T_{soft}$ of the first and second outer cladding portions 106A and 106B is the temperature where the glass composition has a viscosity of $10^{7.6}$ Poise. In some embodiments, a difference between the softening points of the cladding portions 106A and 106B may be greater than or equal to about 2° C. In some embodiments, a difference between the softening points of the outer cladding portions 106A and 106B may be greater than or equal to about 3° C. and less than 100° C. In some embodiments, a difference between the softening points of the outer cladding portions 106A and 106B may be greater than or equal to about 7° C. and less than 100° C.

In some embodiments, the viscosity (at 1650° C.) of the second outer cladding portion 106B minus the viscosity (at 1650° C.) of the first outer cladding portion 106A is $\geq 0.1e^7$ Poise. In some embodiments, the viscosity (at 1650° C.) of the second outer cladding portion 106B minus the viscosity (at 1650° C.) of the first outer cladding portion 106A is $\geq 0.2e^7$ Poise. In some embodiments, the viscosity (at 1650° C.) of the second outer cladding portion 106B minus the viscosity (at 1650° C.) of the first outer cladding portion 106A is $\geq 0.5e^7$ Poise. In some embodiments, the viscosity (at 1650° C.) of the second outer cladding portion 106B minus the viscosity (at 1650° C.) of the first outer cladding portion 106A is $\geq 1e^7$ Poise. In some embodiments, the viscosity (at 1650° C.) of the second outer cladding portion 106B minus the viscosity (at 1650° C.) of the first outer cladding portion 106A is $\geq 1e^8$ Poise. In some embodiments, the viscosity (at 1650° C.) of the second outer cladding portion 106B minus the viscosity (at 1650° C.) of the first outer cladding portion 106A is $\geq 0.1e^7$ Poise and $\leq 1.6e^8$ Poise. In some embodiments, the viscosity (at 1650° C.) of the second outer cladding portion 106B minus the viscosity (at 1650° C.) of the first outer cladding portion 106A is $\geq 0.1e^7$ Poise and $\leq 1e^7$ Poise. Note, scientific notation is used herein, for example, $1e^7$ corresponds to $1 \times 10^7$ (i.e., 10,000, 000).

In some embodiments the second portion or layer of the outer cladding 106 (i.e., the second outer cladding portion 106B) comprises less chlorine than the first outer cladding portion 106A. In some embodiments, the chlorine concentration in the first outer cladding portion 106A is at least 1000 ppm by weight higher than the chlorine concentration in the second outer cladding portion 106B. In some embodiments, the chlorine concentration in the first outer cladding portion 106A is at least 2000 ppm by weight higher than the chlorine concentration in the second outer cladding portion 106B. In some embodiments, the chlorine concentration in the first outer cladding portion 106A is at least 4000 ppm by weight higher than the chlorine concentration in the second outer cladding portion 106B. In some embodiments, the chlorine concentration in the first outer cladding portion 106A is at least 10,000 ppm by weight higher than the chlorine concentration in the second outer cladding portion 106B. According to some embodiments, the first outer cladding portion 106A of the cladding 106 has an average chlorine concentration in the range of 2000-20000 ppm by weight. According to some embodiments, the second outer cladding portion 106B of the outer cladding 106 has a chlorine concentration in the range of 0 to 6000 ppm by weight. In some embodiments the second outer cladding portion 106B of the outer cladding has a radial thickness $(r_3 - r_{3A})$ of greater than or equal to about 2 microns and less than or equal to about 25 microns.

Preferably, the optical fiber 100 has normalized stress relieving parameter $\Phi$, where $\Phi \geq 5$. In some embodiments $100 \geq \Phi \geq 5$. In some embodiments $\Phi \geq 12$. In some embodiments $\Phi \geq 20$. In some embodiments $100 \geq \Phi \geq 12$.

In some embodiments the single mode optical fiber 100 has an attenuation of less than or equal to about 0.185 dB/km at a wavelength of 1550 nm, for example 0.17 to 0.173 dB/km at 1550 nm. According to some embodiments the second outer cladding portion (stress relieving potion) 106B of the outer cladding is in tension, and this second outer cladding portion 106B has an axial stress AS that is greater than 0.3 MPa. In some embodiments the axial stress is greater than 1 MPa. In some embodiments the second outer cladding portion 106B is in tension and has an axial stress of greater than 2 MPa (e.g., 2 MPa to 10 MPa).

As described herein above, according to some embodiments, the relative refractive indices of the core 102, the inner cladding 104, and the outer cladding 106 satisfy the following relationship: $\Delta_{1MAX} > \Delta_{3A} > \Delta_2$.

Embodiments of the optical fiber disclosed herein have reduced attenuation. For example, the optical fiber 100 may have an attenuation of less than or equal to about 0.185 dB/km at a wavelength of 1550 nm. In some embodiments, the optical fiber may have an attenuation of less than or equal to about 0.18 dB/km at a wavelength of 1550 nm, such as less than or equal to about 0.175 dB/km at a wavelength of 1550 nm. Furthermore, the optical fiber 100 may have an attenuation of less than or equal to about 0.325 dB/km at a wavelength of 1310 nm, such as less than or equal to about 0.32 dB/km at a wavelength of 1310 nm. The fiber embodiments of optical fiber designs disclosed herein result in fibers having optical properties that are G.652 compliant (ITU-T standards), MFD from greater than or equal to about 8.2 microns to less than or equal to about 9.5 microns at 1310 nm, such as from greater than or equal to about 9.0 to less than or equal to about 9.4 microns at 1310 nm, zero dispersion wavelength, $\lambda_0$, of $1300 \leq \lambda_0 \leq 1324$ nm, and cable cutoff less than or equal to about 1260 nm. Furthermore, the exemplary embodiments of fiber designs disclosed herein result in fibers having optical properties that are G.654 compliant (ITU-T standards), and for example may exhibit a cable cutoff less than 1530 nm, such as less than 1500 nm. The G.654 applications the fibers may be configured to have dispersion at 1550 nm, which is less than or equal to 22 ps/nm/km.

In some embodiments, the optical fiber 100 may be a large effective area optical fiber. For example, the optical fiber 100 may have an effective area greater than or equal to about 70 microns² at a wavelength of 1550 nm, such as greater than or equal to about 80 microns² at a wavelength of 1550 nm. The optical fiber 100 may have an effective area greater than or equal to about 90 microns² at a wavelength of 1550 nm, such as greater than or equal to about 100 microns² at a wavelength of 1550 nm. The optical fiber 100 may have an effective area less than or equal to about 145 microns² at a wavelength of 1550 nm, such as less than or equal to about 135 microns² at a wavelength of 1550 nm.

The optical fiber 100 may have an effective area less than or equal to about 125 microns² at a wavelength of 1550 nm, such as less than or equal to about 155 microns² at a wavelength of 1550 nm. Accordingly, in embodiments, the optical fiber 100 may have an effective area of from greater than or equal to about 70 microns² to less than or equal to about 145 microns², such as from greater than or equal to about 80 microns² to less than or equal to about 135 microns². The optical fiber 100 may have an effective area of from greater than or equal to about 90 microns² to less than or equal to about 125 microns², for example from at least 100 microns² to no more than about 115 microns².

According to some embodiments, the core 102, inner cladding 104, and outer cladding 106 of the optical fiber 100 may be formed by an outside-vapor-deposition (OVD) process. The OVD process is a way of making optical fiber through reactions from the desired vapor ingredients (including silica and the other desired up dopant precursors) via a hydrolysis process in a $CH_4 + O_2$ flame to form $SiO_2$ or doped-$SiO_2$ soot particles (such as in the range of about 2 nm to 5 microns in diameter, and in some embodiments in the range of about 50 to 500 nm in diameter). The soot particles are then collected by thermopheretic process onto either a bait rod (for making a core soot-preform) or a glass core cane or rod (for making the soot preform). The soot preform is subsequently dried and densified into solid transparent glass in a high temperature furnace (after the bait rod is removed from the core preform), a process commonly referred to as consolidation, forming the final fiber preform 204. The desired core and cladding compositions are achieved by utilizing different amounts of various vapor-phase ingredients for each of the layers in the soot preform fabrication process, for example via the following method(s).

Core Preform: As described in some of the embodiments disclosed herein, the fiber core 102 may be updoped silica glass (e.g. $GeO_2$ doped silica glass). The vapor-precursor-materials that may be used to make the portion of the soot preform associated with the fiber core 102 of embodiments disclosed herein are, for example, $SiCl_4$, $GeCl_4$, $AlCl_3$, $TiCl_4$, or $POCl_3$. This updoped portion of the soot preform (up-doped $SiO_2$ soot) is placed into a furnace, dried (e.g., in an atmosphere comprising chlorine gas) and then the up-doped $SiO_2$ soot is consolidated into a core preform 102' (also referred to herein as a core glass preform or void-free glass core preform). The consolidated core preform 102' is then optionally placed and heated in an air-, nitrogen-, or argon-purged furnace at about 800-1200° C. to outgas helium dissolved in the glass, and then optionally placed into another furnace and redrawn into one core cane 102" or multiple canes (also referred to as core canes 102.1", 102.2", 102.3", etc.).

Core/inner clad cane: Soot of pure $SiO_2$ is deposited on the core preform 102' or cone cane 102" to form a soot/core cane preform assembly having an internal solid glass core cane. (Thus the core cane 102" forms the core $102_P$ of the final preform 204.) This soot/core cane assembly is then placed in a furnace, dried, and then consolidated to fully densified glass preform 104'. The consolidated preform 104' is then optionally placed and heated in an air-, nitrogen-, or argon-purged furnace at about 800-1200° C. to outgas the helium dissolved in the glass, and then optionally placed into another furnace and redrawn into one or multiple canes 104" having a $GeO_2$ doped core $102_P$ surrounded by silica inner clad $104_P$ (also referred to herein as layer $104_P$).

Core/inner clad/first outer clad portion cane: Soot of pure $SiO_2$ is deposited on the core-inner clad preform or on the core-inner clad cane 104' to form a soot preform having an internal solid glass core-inner clad cane—i.e., forming another soot/cane assembly. This soot/cane assembly is then placed in a furnace, dried, doped with chlorine (using dopant precursors such as $SiCl_4$, or $Cl_2$, for example) and then consolidated to fully densified glass so that the densified Cl doped soot forms the first portion of the outer clad of the resultant consolidated core/inner clad/first outer clad portion assembly 106A' with the first outer clad portion of the preform $106A_P$.

Core-inner clad-second outer clad cane: Soot of pure $SiO_2$ or $SiO_2$ plus SiON is then deposited on the glass preform (i.e., on the consolidated core/inner clad/first outer clad portion assembly 106A') to form a soot/cane assembly having a soot layer on a glass cane comprising core-inner clad-first portion of outer clad assembly. This soot/cane assembly is then placed in a furnace, dried, optionally doped with SiON and then consolidated to fully densified glass to form the final optical fiber preform with the outer clad portion $106B_P$. In this exemplary embodiment, the final preform 204 comprises silica with a $GeO_2$ doped core $102_P$, silica inner clad $104_P$, a first outer clad portion $106A_P$ (of the outer clad layer) comprised of silica updoped with chlorine (this portion of the final preform corresponds to the first outer cladding portion 106A of the fiber), and a second outer clad portion $106B_P$ that is comprised of undoped $SiO_2$, or SiON doped silica (this portion of the final preform corresponds to the second outer cladding portion 106B of the fiber). The consolidated final preform 204 with the consolidated outer layer $106B_P$ is then optionally placed and heated in an air-, nitrogen-, or argon-purged furnace at about 800-1200° C. to outgas helium dissolved in the glass. Optical fiber is then drawn from the final preform 204 and the drawn fiber is coated, for example with standard primary and secondary urethane acrylate coatings.

Figure 3:
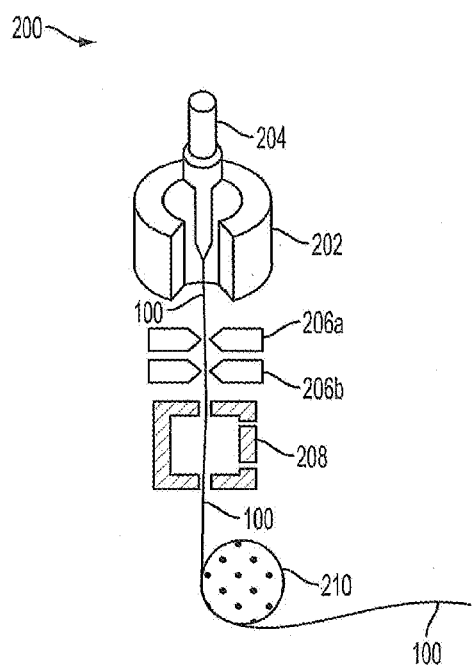
FIG. 3 is a schematic of a system for drawing an optical fiber according to one or more embodiments shown and described herein.

Referring now to FIG. 3, one embodiment of a system 200 for producing an optical fiber is illustrated. The system 200 may comprise a draw furnace 202 for heating an optical fiber preform 204 such that an optical fiber 100 may be drawn from the optical fiber preform 204. The preform 204 may be produced by the OVD method and have the composition and structure as set forth above. The draw furnace 202 may be oriented such that an optical fiber 100 drawn from the optical fiber preform 204 exits the furnace along a substantially vertical pathway.

After the optical fiber 100 exits the draw furnace 202, the diameter of the optical fiber 100 and the draw tension applied to the optical fiber 100 may be measured using non-contact sensors 206a, 206b. Tension may be applied to the optical fiber by any suitable tension-applying mechanism 210. As shown in FIG. 3, after the diameter and tension of the optical fiber 100 are measured, the optical fiber 100 may be passed through a cooling mechanism 208 which provides slow cooling of the optical fiber 100. The cooling mechanism 208 may be any mechanism for cooling an optical fiber as may be presently known in the art or subsequently developed. In one embodiment, the cooling mechanism 208 is filled with a gas that facilitates cooling of the optical fiber 100 at a rate slower than cooling the optical fiber 100 in air at ambient temperatures.

In embodiments, the cooling mechanism 208 may cool the drawn optical fiber from a temperature of about 1600° C. to a temperature of about 1250° C. at a cooling rate of less than or equal to about 5000° C./s, such as less than or equal to about 4750° C./s. In some embodiments, the cooling mechanism 208 may cool the drawn optical fiber from a temperature of about 1600° C. to a temperature of about 1250° C. at a cooling rate of less than or equal to about 4500° C./s, such as less than or equal to about 4250° C./s. In some embodiments, the cooling mechanism 208 may cool the drawn optical fiber from a temperature of about 1250° C. to a temperature of about 1050° C. at a cooling rate of less than or equal to about 12000° C./s, such as less than or equal to about 11500° C./s. The cooling mechanism 208 may cool the drawn optical fiber from a temperature of about 1250° C. to a temperature of about 1050° C. at a cooling rate of less than or equal to about 11000° C./s, such as less than or equal to about 10500° C./s. In some embodiments the cooling mechanism 208 cools the drawn optical fiber from a temperature of about 1400° C. to a temperature of about 1050° C. at a cooling rate of less than or equal to about 4500° C./s, such as less than or equal to about 4250° C./s. In some embodiments, the cooling mechanism 208 may cool the drawn optical fiber from a temperature of about 1050° C. to a temperature of about 850° C. at a cooling rate of less than or equal to about 12000° C./s, such as less than or equal to about 11500° C./s. The cooling mechanism 208 may cool the drawn optical fiber from a temperature of about 1050° C. to a temperature of about 850° C. at a cooling rate of less than or equal to about 11000° C./s, such as less than or equal to about 10500° C./s.

In embodiments described herein, the tension-applying mechanism 210 may apply a tension to the optical fiber 100 of 20 $g_f$ to 400 $g_f$ ($g_f$ refers to grams force), for example 200 $g_f$ or less, or 150 $g_f$ or less (e.g., 30 $g_f$ to 150 $g_f$).

According to some embodiments a method of drawing an optical fiber 100 includes the steps of: (i) providing an optical fiber preform 204 comprising: (a) a core $102_P$ comprising silica and less than or equal to about 11 weight % germania and having a maximum relative refractive index $\Delta_{1MAX}$; (b) an inner clad $104\Delta_P$ surrounding the core $102_P$ and having a minimum relative refractive index $\Delta_2$ where $\Delta_{1MAX} > \Delta_2$; (c) an outer clad $106_P$ surrounding the inner clad and comprising a first outer clad portion $106A_P$ and a second outer clad portion $106B_P$ surrounding the first outer clad portion $106A_P$; and the difference between the glass softening point of the second outer clad portion and the glass softening point of the first outer cladding portion is at least 2° C.; and (ii) drawing the optical fiber 100 from this preform 204. According to the embodiments described herein the tension of the optical fiber during the draw is preferably greater 20 $g_f$ and less than 400 $g_f$, and more preferably greater than 30 $g_f$ and not greater than about 300 $g_f$.

According to some embodiments a method of drawing an optical fiber comprises: (i) providing an optical fiber preform 204 having: (a) a core $102_P$ comprising silica and less than or equal to about 11 weight % germania and having a maximum relative refractive index $\Delta_{1MAX}$; (b) an inner clad $102_P$ surrounding the core $102_P$ and having a minimum relative refractive index $\Delta_2$ and $\Delta_{1MAX} > \Delta_2$; (c) an outer clad $106_P$ surrounding the inner clad and comprising a first outer clad portion $106A_P$ and a second outer clad portion $106B_P$ surrounding the first outer clad portion; and wherein the viscosity (at 1650° C.) of the second outer clad portion minus the viscosity (at 1650° C.) of the first outer clad portion is ≥0.1e$^7$ Poise C (for example, ≥0.5e$^7$ Poise, or between about 0.1e$^7$ Poise and about 1.6e$^8$ Poise); and (ii) drawing the optical fiber 100 from the preform 204. According to the embodiments described herein the tension of the optical fiber during the draw is preferably greater 20 $g_f$ and less than 400 $g_f$, and more preferably greater than 30 $g_f$ and not greater than about 300 $g_f$.

According to some embodiments a method of making the optical fiber preform 204 for making the optical fibers 100 described herein comprises the steps of: (i) providing a glass core cane 102"; (ii) vapor depositing a first soot layer on the core cane wherein the first soot layer comprises silica soot of at least 1 cm in radial thickness and having a first soot surface area; (iii) vapor depositing a second soot layer on the first soot layer wherein the second soot layer comprises silica soot of at least 1 cm in radial thickness and having a second surface area wherein the second soot surface area is less than that the first soot surface area; (iv) doping the deposited first and second soot layers with a chlorine containing compound; (v) sintering the doped first and second soot layers thereby forming a doped preform having a core $102_P$ and at least two layers of glass surrounding the core $102_P$ with higher chlorine dopant concentration in the first layer compared to the chlorine dopant concentration in the second layer. In some embodiments the first soot surface area is >12 m$^2$/g, in some embodiments >15 m$^2$/g, and in some embodiments >20 m$^2$/g. In some embodiments the second soot surface area <10 m$^2$/g, in some embodiments <5 m$^2$/g, in some embodiments <2 m$^2$/g, and in some embodiments <0.5 m$^2$/g. In some embodiments first layer has chlorine concentration: 2000-20000 ppm by weight; and the second layer has chlorine concentration of 0-6000 ppm by weight. According to some embodiments this preform 204 is utilized to draw the optical fibers 100 described herein, and the tension of the optical fiber during the draw is greater 20 $g_f$ and less than 400 $g_f$, and for example greater than 30 $g_f$ and not greater than about 300 $g_f$. In at least some embodiments the second layer corresponds to the second outer cladding portion 106B of the optical fiber 100, and the first layer of the preform corresponds to the first outer cladding portion 106A.

According to some embodiments a method of making the optical fiber preform 204 comprises the steps of:
(i) providing a glass core cane 102";
(ii) depositing soot layer on the core cane 102" and thereby creating a soot layer SL on the core cane wherein the soot layer comprises silica soot of at least 2 cm in radial thickness and having a first soot surface area;
(iii) heating the soot layer from the outside to create a lower average surface area of soot on the outer radial 10 percent portion of the entire soot layer SL as compared to the average surface area of the soot layer on the innermost radial 10 percent portion of the entire soot layer SL;
(iv) doping the deposited soot with a chlorine containing compound; and
(v) sintering the doped soot layer thereby forming a doped preform having a core cane and higher chlorine dopant concentration in the inner radial 10 percent portion of the entire soot layer compared to the chlorine dopant concentration in the outer radial 10 percent portion of the entire soot layer. In some embodiments the soot surface area of the inner radial 10 percent portion of the entire soot layer is >12 $m^2/g$, in some embodiments >15 $m^2/g$, and in some embodiments >20 $m^2/g$. In some embodiments the soot surface area of the outer radial 10 percent portion of the entire soot layer is <10 $m^2/g$, in some embodiments <5 $m^2/g$, in some embodiments <2 $m^2/g$, and in some embodiments <0.5 $m^2/g$. In some embodiments first layer has chlorine concentration: 2000-20000 ppm by weight; and the second layer has chlorine concentration of 0-6000 ppm by weight. In at least some embodiments, the doped (with the higher chlorine amount) inner radial 10 percent portion of the entire soot layer of the preform (i.e., the portion with the higher chlorine amount) corresponds to at least a part of the first outer clad portion $106A_P$ of the preform 204, and to at least a portion of the first outer cladding portion 106A of the optical fiber 100. In at least some embodiments, the outer radial 10 percent portion of the entire soot layer of the preform (i.e., the portion with the lower chlorine amount) corresponds to the second outer cladding portion 106B of the optical fiber 100 and to the outer clad portion $106B_P$ of the preform 204. According to some embodiments this preform is utilized to draw the optical fibers 100 described herein, and the tension of the single mode optical fiber during the draw is between 20 $g_f$ and 400 $g_f$, for example greater than 30 $g_f$ and not greater than about 300 $g_f$.

According to some a method of making the optical fiber preform 204 comprises the steps of:
(i) providing a mandrel;
(ii) vapor depositing a first layer on the mandrel wherein the first layer comprises silica soot of at least 1 cm in radial thickness and having a first soot surface area;
(iii) vapor depositing a second layer on the first layer wherein the second layer comprises silica soot of at least 1 cm in radial thickness and having a second surface area wherein the second soot surface area is less than the first soot surface area;
(iv) removing the mandrel;
(v) doping the deposited soot layers with a chlorine containing compound;
(vi) sintering the doped soot layers thereby forming a doped preform having a higher chlorine dopant concentration in the first layer compared to the chlorine dopant concentration in the second layer.

EXAMPLE

Embodiments will be further clarified by the following examples.

Tables 1A through 1F disclose modeled examples (fiber Examples 1-14) for the embodiments of optical fibers 100 comprising a germanium doped silica core 102, an undoped or doped silica inner cladding 104, a doped silica first outer cladding portion 106A and an undoped or doped silica second outer cladding portion 106B. Dopants in each of these layers (i.e., in core 102, inner cladding 104, first and second outer cladding portions 106A, 106B) can also include $GeO_2$, Cl, F and N as shown. Fiber Examples 1-14 of optical fiber 100 have an outer cladding 106 with the stress relieving layer. That is, the second outer cladding layer 106B of these fibers is the stress relieving layer. Tables 1A-1F also provide data for the comparative fiber examples 1-3 which do not have the stress relieving second outer cladding layer.

Tables 1A through 1F show: (a) the dopants in weight percent (the remainder being silica) present in the core 102, inner cladding 104, first outer cladding portion 106A and second outer cladding portion 106B of the optical fibers 100, (b) the relative refractive index % Δ of each layer, (c) the outer radius of each layer in microns, (d) the softening point in ° C., the viscosity of each fiber layer at 1650° C., (e) the viscosity (at 1650° C.) of each fiber layer times the area of that layer in Poise·microns²; and (f) the normalized stress relieving parameter, Φ. More specifically, Table 1A discloses the core parameters. Table 1B discloses the parameters associated with the inner cladding 104. Table 1C discloses the parameters associated with the first cladding portion 106A. Table 1D discloses the parameters associated with the second cladding portion 106B. In addition, Table 1E provides data for the viscosity of the second outer cladding layer 106B at 1650° C. times the area of second outer cladding layer (this layer is also described herein as a stress relieving layer), normalized viscosity of this layer times the area, and the normalized stress relieving parameter, Φ. Table 1F discloses modeled axial stresses in the core 102, inner cladding 104, and in first and second outer cladding layers (i.e. in portions 106A and 106B of the outer cladding 106) of the optical fiber 100 embodiments drawn respectively at 50 g and 150 g draw tensions.

More specifically fiber Examples 1-14 are exemplary embodiments of optical fibers 100 which have the stress relieving second outer cladding layer 106B. Also shown in Tables 1A-1F are comparative examples fibers 1-3 which do not have the stress relieving second outer cladding layer 106B.

Some of the fiber embodiments disclosed herein may comprise 5-10 weight percent germania (e.g., 7-10 weight percent germania in Table 1A) and 0 to 0.1 weight percent Cl in the core 102 (0.1 weight % in embodiments shown Table 1A), a core radius of 3.5 to 8 microns (see, for example, in Table 1A), a core delta of 0.25 to 0.55% (0.26 to 0.51% in embodiments shown Table 1A), an inner cladding radius $r_1$ of 13 to 20 microns (e.g., 13 microns in Table 1B), a first outer cladding radius $r_{3A}$ of 40 to 55 microns (e.g., 40 to 50 or 55 microns in embodiments shown Table 1C) and a second outer cladding layer radius $r_3$ of 60-65 microns (e.g., 62.5 microns in embodiments shown in Table 1D). In some embodiments the first outer cladding layer 106A comprises 0.2 to 1.5 weight percent chlorine (e.g., 0.4 to 1.5% in embodiments shown Table 1C). The second outer cladding layer 106B comprises Cl and/or N from 0 to 0.2 weight percent (for example, see embodiments shown Table 1D).

The comparative examples 1-3 depicted in Tables 1A-1F have only one outer cladding layer with an outer radius of 62.5 microns, and no second outer cladding layer (thus for convenience, in these tables the first outer cladding layer—i.e., the first outer cladding layer extends to the outer most edge of the comparative optical fiber). These comparative example fibers 1-3 have constant (uniform) dopant concentration in the outer cladding layer.

For the embodiments of the exemplary optical fiber embodiments of Tables 1A-1F, the softening points of the core 102, inner cladding 104, first outer cladding layer 106A and second outer cladding layer 106B are 1600° C. to 1650° C., 1650° C. to 1700° C., 1650° C. to 1700° C., and 1650° C. to 1770° C., respectively. The viscosity (at 1650° C., in Poise) of the second outer cladding portion 106B minus the viscosity of the first outer cladding portion 106A is 0.1e$^7$ to 1.6e$^8$. The viscosity (at 1650° C.) in Poise of the core, inner cladding, first outer cladding and second outer cladding is between 2×10$^7$ to 4×10$^7$, 5×10$^7$ to 6×10$^7$, 4×10$^7$ to 5.5×10$^7$, and 5×10$^7$ to 3×10$^8$, respectively. For each of the fiber layer, the viscosity of each layer (at 1650° C.) times the area of that layer (in Poise·microns$^2$) is: 1×10$^9$ to 8×10$^9$ (core), 2×10$^{10}$ to 3×10$^{10}$ (inner cladding), 1×10$^{11}$ to 8×10$^{11}$ (first outer cladding), and 1×10$^{11}$ to 8×10$^{12}$ (second outer cladding), respectively. The normalized stress relieving parameter, Φ, for the fiber embodiments of examples 1-14 is between 5 and 300.

In contrast, the normalized stress relieving parameter, Φ for the fibers of comparative examples 1-3 is 0. Thus, the optical fibers 100 according to the embodiments of the present invention have lower fiber attenuation than the comparative example fibers because they have the outer stress relieving layer 106B, and thus show significant stress relief to the core and inner cladding of these optical fibers. The comparative fibers examples do not have stress relieving layer 106B, nor do they show this benefit.

Tables 1A-1F disclose the following parameters for the fiber embodiments of examples 1-14: dopants (GeO2, Cl, F, and SiON) in weight % for the core, inner cladding, first outer cladding portion and second outer cladding portion (or layer); outer radii of the core, inner cladding, first outer cladding layer, and second outer cladding layer; relative refractive indices (relative to pure undoped silica); the softening point of the core, inner cladding, first outer cladding layer and second outer cladding layer; viscosity at 1650° C., viscosity times area of each layer; normalized viscosity times area Ω; normalized area of stress relieving area Ψ; and the normalized stress relieving parameter Φ. The three comparative fiber examples (Comp. 1, 2 and 3) in Tables 1A-1F are also shown. These comparative example fibers have a uniform outer cladding, i.e., they only have a first outer cladding layer which goes to the outer edge of the fiber (they do not have a second outer cladding layer and thus for the comparative example fibers the parameters associated with the second outer cladding portion are designated in the tables as "na" which refers to not applicable). For the fiber embodiments of examples 1-14 the axial compression shown in these tables is that of the first outer cladding layer. For the three comparative example fibers the first outer cladding layer constitutes the entire outer cladding).

The analysis results show the fiber of the exemplary fiber embodiments (examples 1-14 fibers) disclosed herein have a stress relieving parameter Φ≥5, that corresponds to the second outer cladding layer (second outer cladding portion 106B) in axial tension having an axial stress of ≥0.3 MPa when the fiber is drawn at 50 g draw tension and ≥1 MPa when the fiber is drawn at 150 g draw tension (i.e., 50 g$_f$ and 150 g$_f$, respectively). Thus, the second outer cladding portion 106B with Φ≥5 enables lower optical fiber attenuation as described above. The results also show the optical fiber embodiments having a stress relieving outer layer (second outer cladding portion 106B) have a softening point difference ($T_{soft}$ of second outer cladding layer minus the $T_{soft}$ of first outer cladding layer) of ≥2° C. (in some embodiments ≥3° C. and in some embodiments ≥7° C.). The comparative optical fibers do not have a stress relieving outer cladding layer nor have a glass with a lower softening point in the outer portion of the outer cladding as compared to the glass in the inner portion of the outer cladding.

TABLE 1A

| Example | Core GeO2, wt. % | Core Chlorine, wt. % | Core Fluorine, wt. % | Index of Core, % Δ | Core Radius R1, microns | Softening Point of Core, ° C. | Viscosity (at 1650° C.) of Core, Poise | Viscosity (at 1650° C.) • Area of Core, Poise • microns$^2$ |
|---|---|---|---|---|---|---|---|---|
| 1 | 7 | 0.1 | 0 | 0.36 | 4 | 1634.9 | 3.1E+07 | 1.6E+09 |
| 2 | 7 | 0.1 | 0 | 0.36 | 4 | 1634.9 | 3.1E+07 | 1.6E+09 |
| 3 | 7 | 0.1 | 0 | 0.36 | 4 | 1634.9 | 3.1E+07 | 1.6E+09 |
| 4 | 8 | 0.1 | 0 | 0.41 | 6 | 1630.5 | 2.9E+07 | 3.3E+09 |
| 5 | 5 | 0.1 | 0 | 0.26 | 8 | 1643.8 | 3.6E+07 | 7.2E+09 |
| 6 | 7 | 0.1 | 0 | 0.36 | 4 | 1634.9 | 3.1E+07 | 1.6E+09 |
| 7 | 7 | 0.1 | 0 | 0.36 | 4 | 1634.9 | 3.1E+07 | 1.6E+09 |
| 8 | 7 | 0.0 | 0 | 0.35 | 4 | 1635.7 | 3.1E+07 | 1.6E+09 |
| 9 | 9 | 0.1 | 0 | 0.46 | 3.5 | 1626.1 | 2.7E+07 | 1.0E+09 |
| 10 | 7 | 0.1 | 0 | 0.36 | 4 | 1634.9 | 3.1E+07 | 1.6E+09 |
| 11 | 7 | 0.1 | 0 | 0.36 | 4 | 1634.9 | 3.1E+07 | 1.6E+09 |
| 12 | 7 | 0.1 | 0 | 0.36 | 4 | 1634.9 | 3.1E+07 | 1.6E+09 |
| 13 | 10 | 0.1 | 0 | 0.51 | 4 | 1621.8 | 2.5E+07 | 1.3E+09 |
| 14 | 10 | 0.1 | 0 | 0.51 | 4 | 1621.8 | 2.5E+07 | 1.3E+09 |
| Comparative Example 1 | 7 | 0.1 | 0 | 0.36 | 4 | 1634.9 | 3.1E+07 | 1.6E+09 |

TABLE 1A-continued

| Example | Core GeO2, wt. % | Core Chlorine, wt. % | Core Fluorine, wt. % | Index of Core, % Δ | Core Radius R1, microns | Softening Point of Core, °C. | Viscosity (at 1650° C.) of Core, Poise | Viscosity (at 1650° C.) • Area of Core, Poise • microns$^2$ |
|---|---|---|---|---|---|---|---|---|
| Comparative Example 2 | 7 | 0.1 | 0 | 0.36 | 4 | 1634.9 | 3.1E+07 | 1.6E+09 |
| Comparative Example 3 | 10 | 0.1 | 0 | 0.51 | 4 | 1621.8 | 2.5E+07 | 1.3E+09 |

TABLE 1B

| Example | Inner Cladding GeO2, wt. % | Inner Cladding Chlorine, wt. % | Inner Cladding Fluorine, wt. % | Index of Inner Cladding, % Δ | Inner Cladding Radius R2, microns | Softening Point of Inner Cladding, °C. | Viscosity (at 1650° C.) of Inner Cladding, Poise | Viscosity (at 1650° C.) • Area of Inner Cladding, Poise • microns$^2$ |
|---|---|---|---|---|---|---|---|---|
| 1 | 0 | 0.1 | 0 | 0.01 | 13 | 1666.3 | 5.2E+07 | 2.5E+10 |
| 2 | 0 | 0.1 | 0 | 0.01 | 13 | 1666.3 | 5.2E+07 | 2.5E+10 |
| 3 | 0 | 0.1 | 0 | 0.01 | 13 | 1666.3 | 5.2E+07 | 2.5E+10 |
| 4 | 0 | 0.1 | 0 | 0.01 | 13 | 1666.3 | 5.2E+07 | 2.2E+10 |
| 5 | 0 | 0.1 | 0 | 0.01 | 20 | 1666.3 | 5.2E+07 | 5.5E+10 |
| 6 | 0 | 0.1 | 0 | 0.01 | 13 | 1666.3 | 5.2E+07 | 2.5E+10 |
| 7 | 0 | 0.1 | 0 | 0.01 | 13 | 1666.3 | 5.2E+07 | 2.5E+10 |
| 8 | 0 | 0.1 | 0 | 0.01 | 13 | 1666.3 | 5.2E+07 | 2.5E+10 |
| 9 | 0 | 0.1 | 0 | 0.01 | 13 | 1666.3 | 5.2E+07 | 2.6E+10 |
| 10 | 0 | 0.1 | 0 | 0.01 | 13 | 1666.3 | 5.2E+07 | 2.5E+10 |
| 11 | 0 | 0.1 | 0 | 0.01 | 13 | 1666.3 | 5.2E+07 | 2.5E+10 |
| 12 | 0 | 0.1 | 0 | 0.01 | 13 | 1666.3 | 5.2E+07 | 2.5E+10 |
| 13 | 0 | 0.1 | 0 | 0.01 | 13 | 1666.3 | 5.2E+07 | 2.5E+10 |
| 14 | 0 | 0.1 | 0 | 0.01 | 13 | 1666.3 | 5.2E+07 | 2.5E+10 |
| Comparative Example 1 | 0 | 0.1 | 0 | 0.01 | 13 | 1666.3 | 5.2E+07 | 2.5E+10 |
| Comparative Example 2 | 0 | 0.1 | 0 | 0.01 | 13 | 1666.3 | 5.2E+07 | 2.5E+10 |
| Comparative Example 3 | 0 | 0.1 | 0 | 0.01 | 13 | 1666.3 | 5.2E+07 | 2.5E+10 |

TABLE 1C

| Example | First Outer Cladding portion GeO2, wt. % | First Outer Cladding portion Chlorine, wt. % | First Outer Cladding portion Fluorine, wt. % | Index of First Outer Cladding portion, % Δ | First Outer Cladding portion Radius R3A, microns | Softening Point of First Outer Cladding portion, °C. | Viscosity (at 1650° C.) of First Outer Cladding portion, Poise | Viscosity (at 1650° C.) • Area of First Outer Cladding portion, Poise • microns$^2$ |
|---|---|---|---|---|---|---|---|---|
| 1 | 0 | 0.4 | 0 | 0.04 | 40 | 1663.8 | 5.0E+07 | 2.2E+11 |
| 2 | 0 | 0.4 | 0 | 0.04 | 50 | 1663.8 | 5.0E+07 | 3.6E+11 |
| 3 | 0 | 0.4 | 0 | 0.04 | 55 | 1663.8 | 5.0E+07 | 4.5E+11 |
| 4 | 0 | 0.4 | 0 | 0.04 | 40 | 1663.8 | 5.0E+07 | 2.2E+11 |
| 5 | 0 | 0.4 | 0 | 0.04 | 40 | 1663.8 | 5.0E+07 | 1.9E+11 |
| 6 | 0 | 0.4 | 0 | 0.04 | 40 | 1663.8 | 5.0E+07 | 2.2E+11 |
| 7 | 0 | 0.8 | 0 | 0.08 | 40 | 1660.5 | 4.7E+07 | 2.1E+11 |
| 8 | 0 | 0.4 | 0 | 0.04 | 40 | 1663.8 | 5.0E+07 | 2.2E+11 |
| 9 | 0 | 0.4 | 0 | 0.04 | 50 | 1663.8 | 5.0E+07 | 3.6E+11 |
| 10 | 0 | 0.4 | 0 | 0.04 | 40 | 1663.8 | 5.0E+07 | 2.2E+11 |
| 11 | 0 | 0.4 | 0 | 0.04 | 40 | 1663.8 | 5.0E+07 | 2.2E+11 |
| 12 | 0 | 0.8 | 0 | 0.08 | 50 | 1660.5 | 4.7E+07 | 3.5E+11 |
| 13 | 0 | 1.5 | 0 | 0.15 | 40 | 1654.8 | 4.3E+07 | 1.9E+11 |
| 14 | 0 | 1.5 | 0 | 0.15 | 50 | 1654.8 | 4.3E+07 | 3.2E+11 |
| Comparative Example 1 | 0 | 0.4 | 0 | 0.04 | 62.5 | 1663.8 | 5.0E+07 | 5.9E+11 |

TABLE 1C-continued

| Example | First Outer Cladding portion GeO2, wt. % | First Outer Cladding portion Chlorine, wt. % | First Outer Cladding portion Fluorine, wt. % | Index of First Outer Cladding portion, % Δ | First Outer Cladding portion Radius R3A, microns | Softening Point of First Outer Cladding portion, ° C. | Viscosity (at 1650° C.) of First Outer Cladding portion, Poise | Viscosity (at 1650° C.) • Area of First Outer Cladding portion, Poise • microns$^2$ |
|---|---|---|---|---|---|---|---|---|
| Comparative Example 2 | 0 | 0.1 | 0 | 0.01 | 62.5 | 1666.3 | 5.2E+07 | 6.1E+11 |
| Comparative Example 3 | 0 | 0.4 | 0 | 0.04 | 62.5 | 1663.8 | 5.0E+07 | 5.9E+11 |

TABLE 1D

| Example | Second Outer Cladding portion GeO2, wt. % | Second Outer Cladding portion Chlorine, wt. % | Second Outer Cladding portion Fluorine, wt. % | Second Outer Cladding portion Nitrogen (N), wt. % | Index of Second Outer Cladding portion, % Δ | Second Outer Cladding portion Radius R3, microns | Softening Point of Second Outer Cladding portion, ° C. | Viscosity (at 1650° C.) of Second Outer Cladding portion, Poise |
|---|---|---|---|---|---|---|---|---|
| 1 | 0 | 0 | 0 | 0 | 0 | 62.5 | 1667.1 | 5.3E+07 |
| 2 | 0 | 0 | 0 | 0 | 0 | 62.5 | 1667.1 | 5.3E+07 |
| 3 | 0 | 0 | 0 | 0 | 0 | 62.5 | 1667.1 | 5.3E+07 |
| 4 | 0 | 0 | 0 | 0 | 0 | 62.5 | 1667.1 | 5.3E+07 |
| 5 | 0 | 0 | 0 | 0 | 0 | 62.5 | 1667.1 | 5.3E+07 |
| 6 | 0 | 0 | 0 | 0.2 | 0.2 | 62.5 | 1757.5 | 2.1E+08 |
| 7 | 0 | 0 | 0 | 0 | 0 | 62.5 | 1667.1 | 5.3E+07 |
| 8 | 0 | 0 | 0 | 0 | 0 | 62.5 | 1667.1 | 5.3E+07 |
| 9 | 0 | 0 | 0 | 0 | 0 | 62.5 | 1667.1 | 5.3E+07 |
| 10 | 0 | 0.1 | 0 | 0 | 0.01 | 62.5 | 1666.3 | 5.2E+07 |
| 11 | 0 | 0.2 | 0 | 0 | 0.02 | 62.5 | 1665.5 | 5.1E+07 |
| 12 | 0 | 0.2 | 0 | 0 | 0.02 | 62.5 | 1665.5 | 5.1E+07 |
| 13 | 0 | 0.2 | 0 | 0 | 0.02 | 62.5 | 1665.5 | 5.1E+07 |
| 14 | 0 | 0.2 | 0 | 0 | 0.02 | 62.5 | 1665.5 | 5.1E+07 |
| Comparative Example 1 | na | na | na | na | na | na | na | na |
| Comparative Example 2 | na | na | na | na | na | na | na | na |
| Comparative Example 3 | na | na | na | na | na | na | na | na |

TABLE 1E

| Example | Viscosity (at 1650° C.) • Area of Second Outer Cladding portion, Poise • microns$^2$ | Softening Point difference (T$_{soft}$ of 2nd outer cladding portion minus T$_{soft}$ of the 1st outer cladding portion), ° C. | Viscosity (at 1650° C.) of Second Outer Cladding portion minus Viscosity (at 1650° C.) of First Outer Cladding portion, Poise | Normalized Viscosity • Area, Ω | Normalized area of stress relieving layer, Ψ | Normalized stress relieving parameter, Φ |
|---|---|---|---|---|---|---|
| 1 | 3.8E+11 | 3.3 | 2.7.E+06 | 6.0E-01 | 5.9E-01 | 12.8 |
| 2 | 2.3E+11 | 3.3 | 2.7.E+06 | 3.7E-01 | 3.6E-01 | 12.4 |
| 3 | 1.5E+11 | 3.3 | 2.7.E+06 | 2.4E-01 | 2.3E-01 | 9.5 |
| 4 | 3.8E+11 | 3.3 | 2.7.E+06 | 6.0E-01 | 5.9E-01 | 14.3 |
| 5 | 3.8E+11 | 3.3 | 2.7.E+06 | 6.0E-01 | 5.9E-01 | 13.5 |
| 6 | 1.5E+12 | 93.7 | 1.6.E+08 | 8.6E-01 | 5.9E-01 | 268.9 |
| 7 | 3.8E+11 | 6.6 | 5.3.E+06 | 6.1E-01 | 5.9E-01 | 24.2 |
| 8 | 3.8E+11 | 3.3 | 2.7.E+06 | 6.0E-01 | 5.9E-01 | 12.8 |
| 9 | 2.3E+11 | 3.3 | 2.7.E+06 | 3.7E-01 | 3.6E-01 | 12.3 |
| 10 | 3.8E+11 | 2.5 | 2.0.E+06 | 6.0E-01 | 5.9E-01 | 9.6 |
| 11 | 3.7E+11 | 1.7 | 1.3.E+06 | 6.0E-01 | 5.9E-01 | 6.4 |
| 12 | 2.3E+11 | 5.0 | 3.9.E+06 | 3.8E-01 | 3.6E-01 | 17.8 |
| 13 | 3.7E+11 | 10.7 | 8.2.E+06 | 6.3E-01 | 5.9E-01 | 37.7 |
| 14 | 2.3E+11 | 10.7 | 8.2.E+06 | 4.0E-01 | 3.6E-01 | 38.5 |
| Comparative Example 1 | na | 0.0 | 0.0.E+00 | 0.0E+00 | 0.0E+00 | 0.0 |

TABLE 1E-continued

| Example | Viscosity (at 1650° C.) • Area of Second Outer Cladding portion, Poise • microns² | Softening Point difference ($T_{soft}$ of 2nd outer cladding portion minus $T_{soft}$ of the 1st outer cladding portion), ° C. | Viscosity (at 1650° C.) of Second Outer Cladding portion minus Viscosity (at 1650° C.) of First Outer Cladding portion, Poise | Normalized Viscosity • Area, Ω | Normalized area of stress relieving layer, Ψ | Normalized stress relieving parameter, Φ |
|---|---|---|---|---|---|---|
| Comparative Example 2 | na | 0.0 | 0.0.E+00 | 0.0E+00 | 0.0E+00 | 0.0 |
| Comparative Example 3 | na | 0.0 | 0.0.E+00 | 0.0E+00 | 0.0E+00 | 0.0 |

TABLE 1F

| Example | Core axial stress (drawn at 50 g tension), MPa | Inner Cladding axial stress (drawn at 50 g tension), MPa | First Outer Cladding portion axial stress (drawn at 50 g tension), MPa | Second Outer Cladding portion axial stress (drawn at 50 g tension), MPa | Core axial stress (drawn at 150 g tension), MPa | Inner Cladding axial stress (drawn at 150 g tension), MPa | First Outer Cladding portion axial stress (drawn at 150 g tension), MPa | Second Outer Cladding portion axial stress (drawn at 150 g tension), MPa |
|---|---|---|---|---|---|---|---|---|
| 1 | 24 | 0.2 | −1.4 | 0.7 | −5.2 | 0.8 | −3.9 | 2.4 |
| 2 | 25 | 0.7 | −0.9 | 1.2 | −4.3 | 2.3 | −2.5 | 4.0 |
| 3 | 25 | 1.0 | −0.7 | 1.5 | −3.8 | 3.2 | −1.6 | 4.9 |
| 4 | 28 | 0.0 | −1.6 | 0.5 | −4.5 | 0.8 | −3.9 | 2.5 |
| 5 | 17 | −0.1 | −1.7 | 0.4 | −5.9 | 0.6 | −4.2 | 2.2 |
| 6 | 9 | −25.6 | −26.2 | 18.0 | −51.2 | −76.6 | −78.2 | 54.3 |
| 7 | 25 | 0.9 | −2.8 | 1.5 | −3.9 | 3.1 | −7.9 | 4.7 |
| 8 | 25 | 0.2 | −1.4 | 0.7 | −4.2 | 0.8 | −4.0 | 2.4 |
| 9 | 32 | 0.7 | −1.0 | 1.2 | −2.6 | 2.3 | −2.5 | 3.9 |
| 10 | 25 | 0.5 | −1.1 | 0.5 | −4.6 | 1.8 | −3.0 | 1.8 |
| 11 | 25 | 0.8 | −0.8 | 0.3 | −4.0 | 2.8 | −2.1 | 1.1 |
| 12 | 25 | 1.6 | −2.1 | 1.0 | −2.6 | 5.1 | −6.1 | 3.5 |
| 13 | 37 | 2.9 | −4.5 | 2.3 | 2.0 | 9.1 | −12.9 | 7.4 |
| 14 | 38 | 4.6 | −3.0 | 4.0 | 4.5 | 14.4 | −8.6 | 12.6 |
| Comparative Example 1 | 25 | 1.5 | −0.2 | na | −2.9 | 4.7 | −0.2 | na |
| Comparative Example 2 | 24 | 0.0 | 0.0 | na | −5.7 | 0.0 | 0.0 | na |
| Comparative Example 3 | 37 | 1.4 | −0.2 | na | 0.1 | 4.7 | −0.2 | na |

Manufactured Optical Fibers

The Example 1 fiber embodiment of Tables 1A-1F comprises a stress relieving second outer cladding portion 106B. This optical fiber 100 was manufactured as follows: A 1 meter long 11 mm diameter cane 104' having a germania doped silica core $102_P$ (0.36% delta vs. silica, containing 7.8 weight % $GeO_2$ and 0.1 weight % Cl) and a silica based cladding layer $104_P$ (containing silica and 0.1 weight % Cl, and corresponding to the inner cladding layer 104 in the fiber 100) and a core-cladding diameter ratio of 0.35 was placed on a lathe. 1780 grams of silica soot (0.5 g/cc) was flame deposited on this cane. The core cane-soot assembly was placed into a furnace, dried at about 1100° C. in an atmosphere comprising He and $Cl_2$, then doped in an atmosphere comprising He and $SiCl_4$, and in an atmosphere comprising He and $SiCl_4$ was sintered to dense glass preform by ramping the preform to about 1500° C. (thus obtaining a void-free glass preform 106A'). This resultant preform 106A' was removed from the furnace, cooled to room temperature, placed back on the lathe where an additional 2860 grams of soot was deposited thereon. This preform with the outer soot layer was placed into a furnace, dried at about 1100° C. in an atmosphere comprising He and CO then sintered in an atmosphere comprising He to a dense glass preform by ramping the preform to about 1500° C. (thus obtaining an essentially void-free glass preform 204 with a $GeO_2$-doped silica core $102_P$, silica based inner clad $104_P$, Cl-doped silica first outer clad $106A_P$ and silica second outer clad $106B_P$. The second over clad layer of the preform corresponds to the stress relieving layer/second outer cladding portion 106B of the drawn fibers 100. The preform's silica based core $102_P$ contained 7.8 weight % GeO2 and 0.1 weight % Cl, the silica based inner clad $104_P$ contained 0.1 weight % Cl, the first outer clad layer $106A_P$ contained 0.8 weight % Cl, and a stress relieving second outer clad layer $106B_P$ comprised silica and contained no Cl. The preform 204 was placed in an argon purged holding oven at 1000° C. for 24 hours to outgas helium from the preform. The preform 204 was then placed in a draw furnace and 125 micron diameter optical fibers 100 were drawn at three different tensions (5 km each at 50, 100 and 150 grams tension (i.e., 50 $g_f$, 100 $g_f$, and 150 $g_f$)) and coated. More specifically the coated optical fibers 100 include a two layer urethane acrylate coating situated over the stress relieving outer cladding layer 106B.

Comparative Example 1

(The Fiber which does not Comprise a Stress Relieving Cladding Layer) was Made as Follows A 1 meter long 11 mm diameter core cane having a germania doped silica core (0.36% delta vs. silica, containing 7.8 weight % GeO$_2$ and 0.1 weight % Cl) and a silica clad (containing 0.1 weight % Cl) and a core clad diameter ratio of 0.35 was placed on a lathe. 4640 grams of silica soot (0.5 g/cc) was flame deposited on this cane. The core cane-soot assembly was placed into a furnace, dried at about 1100° C. in an atmosphere comprising He and Cl$_2$, then doped in an atmosphere comprising He and SiCl$_4$, and in an atmosphere comprising He and SiCl$_4$ was sintered to dense glass preform by ramping the preform to about 1500° C. (thus obtaining a core cane overclad void-free glass preform), thus obtaining a GeO$_2$-doped silica core cane, Cl-doped silica overclad void-free glass preform. This preform comprised a silica core containing 7.8 weight % GeO2 and 0.1 weight % Cl, a silica inner clad containing 0.1 weight % Cl, a silica overclad containing 0.8 weight % Cl (there was no stress relieving second outer cladding layer). The preform was placed in an argon purged holding oven at 1000° C. for 24 hours to outgas helium from the preform. The preform was then placed in a draw furnace and 125 micron diameter optical fibers were drawn at three different tensions (5 km each at 50, 100 and 150 grams tension) and the optical fibers were coated with a two layer urethane acrylate coating.

The parameters for of these two manufactured optical fibers are shown in Table 2. Table 2 illustrates the fiber embodiments having a stress relieving parameter Ψ of 0.36 (and Φ of 25.5) that corresponds to the second outer cladding 106B being in axial tension having an axial stress of 4 MPa (for fibers drawn 50 g draw tension) and 12.6 MPa (for fibers drawn at 150 g draw tension), which enabled lower attenuation in these optical fibers by relieving stress in the core and inner cladding as compared to comparative optical fibers without such stress relieving outer cladding layer. In addition, the example optical fibers 100 of Table 2 with the stress relieving outer layers 106B have a softening point difference (second outer cladding layer minus the first outer cladding layer) of 6.6° C., whereas comparative optical fibers without stress relieving outer cladding layer do not have this feature and have a lower softening point in the entire outer cladding.

TABLE 2

| Parameter | Inventive Example 1 | Comparative Example 1 |
|---|---|---|
| Core GeO2, wt. % | 7.8 | 7.8 |
| Core Chlorine, wt. % | 0.1 | 0.1 |
| Index of Core, % Δ1 max | 0.4 | 0.4 |
| Core Radius R1, microns | 4.5 | 4.5 |
| Softening Point of Core, ° C. | 1631.4 | 1631.4 |
| Viscosity (at 1650° C.) of Core, Poise | 2.9E+07 | 2.9E+07 |
| Viscosity (at 1650° C.) · Area of Core, Poise · microns$^2$ | 1.9E+09 | 1.9E+09 |
| Inner Cladding Chlorine, wt. % | 0.1 | 0.1 |
| Index of Inner Cladding, % Δ2 | 0.01 | 0.01 |
| Inner Clad Radius r$_2$, microns | 12.7 | 12.7 |
| Softening Point of Inner Clad, ° C. | 1666.3 | 1666.3 |
| Viscosity (at 1650° C.) of Inner Clad, Poise | 5.2E+07 | 5.2E+07 |
| Viscosity (at 1650° C.) · Area of Inner Clad, Poise · microns$^2$ | 2.3E+10 | 2.3E+10 |
| First Outer Cladding Chlorine, wt. % | 0.8 | 0.8 |
| Index of First Outer Cladding portion, % Δ3 | 0.08 | 0.08 |

TABLE 2-continued

| Parameter | Inventive Example 1 | Comparative Example 1 |
|---|---|---|
| First Outer Cladding portion Radius r$_{3,4}$, microns | 42 | 62.5 |
| Softening Point of First Outer Cladding portion, ° C. | 1660.5 | 1660.5 |
| Viscosity (at 1650° C.) of First Outer Cladding portion 106A, Poise | 4.7E+07 | 4.7E+07 |
| Viscosity (at 1650° C.) · Area of First Outer Cladding portion, Poise · microns$^2$ | 2.4E+11 | 5.6E+11 |
| Second Outer Cladding portion, Chlorine, wt. % | 0.0 | na |
| Index of Second Outer Cladding portion, % Δ4 | 0 | na |
| Second Outer Cladding portion Radius R3, microns | 62.5 | na |
| Softening Point of Second Outer Clad, ° C. | 1667.1 | na |
| Viscosity (at 1650° C.) of Second Outer Cladding portion 106B, Poise | 5.3E+07 | na |
| Softening Point difference (2nd outer cladding portion minus that of the 1st outer cladding portion), ° C. | 6.6 | 0.0 |
| Viscosity (at 1650° C.) · Area of Second Outer Cladding, Poise · microns$^2$ | 3.5E+11 | na |
| Normalized Viscosity · Area, Ω | 0.40 | 0.00 |
| Normalized area of stress relieving layer 106B, Ψ | 0.36 | 0.00 |
| Normalized stress relieving parameter, Φ | 25.5 | 0.0 |
| Core axial stress (drawn at 50 g tension), MPa | 38 | 25 |
| Inner Cladding axial stress (drawn at 50 g tension), MPa | 4.6 | 1.5 |
| First Outer Cladding's axial stress (drawn at 50 g tension), MPa | −3.0 | −0.2 |
| Second Outer Cladding's axial stress (fiber is drawn at 50 g tension), MPa | 4.0 | na |
| Core's axial stress (drawn at 150 g tension), MPa | 4.5 | −2.9 |
| Inner Cladding's axial stress (fiber is drawn at 150 g tension), MPa | 14.4 | 4.7 |
| First Outer Cladding's axial stress (fiber is drawn at 150 g tension), MPa | −8.6 | −0.2 |
| Second Outer Cladding's axial stress (fiber is drawn at 150 g tension), MPa | 12.6 | na |

Figure 4A:
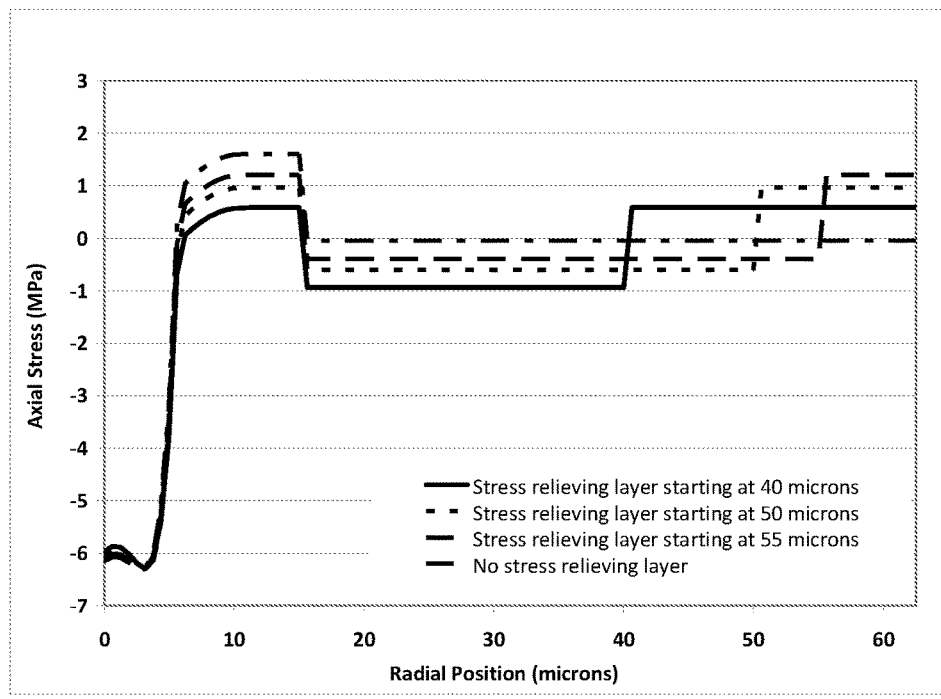
FIG. 4A illustrates modeled axial stress for different fiber profile designs.

FIG. 4A illustrates modelled axial stress for different fiber profile designs (similar to that shown in FIG. 2A) of the optical fibers 100 with stress relieving layer (second outer cladding portion 106B) starting at different radial locations r$_{3A}$ (40 μm, 50 μm, and 55 μm respectively) in the outer cladding layer 106. In these embodiments, the first outer cladding portion 106A was updoped to 0.03% delta (relative to pure silica) via Cl-doped silica, the second outer cladding portion 106B comprised pure silica, and the fibers were drawn at a tension of 150 g. FIG. 4A axial stress parameter vs. radial position (r) within the three fibers 100 according to the embodiments of the present invention, and in a comparative fiber without the stress relieving layer. More specifically, FIG. 4A demonstrates three examples of optical fibers 100 where the stress relieving layer (second outer cladding portion 106B) is in axial tension having an axial stress of ≥0.3 MPa (for the fiber(s) drawn at 50 g draw tension) and ≥1 MPa (for the fibers drawn at 150 g draw tension). It also demonstrates that in optical fibers 100 having a stress relieving layer (second outer cladding portion 106B) the first portion of the outer cladding is under significantly less axial stress than the second portion of the outer cladding, and also under significantly less axial stress than the outer cladding of the fiber with no stress relieving layer. This outer cladding 106 that comprises a stress relieving layer in fibers 100 enables lower optical fiber attenuation.

Control of doping level of a silica soot preform can be achieved by controlling the initial surface area of the soot. The vapor-phase doping level is proportional to the initial soot surface area. As a surrogate for measuring soot surface area, soot (glass) density can be used because it is inversely proportional to soot surface area. Applicants discovered that the desired doping concentration profile can be achieved by controlling the radial soot surface area profile of a preform. For example, a silica soot preform having a lower density (e.g., 0.3 to 0.8 g/cm$^3$) on the inner radial portion of the soot layer and a higher density (e.g., 1.0 to 1.9 g/cm$^3$) on the outer radial portion of the soot layer, when vapor phase doped from either outside or inside (with, for example, chlorine) will have higher concentration of dopant on the inside portion than the outer portion of the perform. In some embodiments it is preferred to have a density of about 0.3 to 0.8 g/cm$^3$ on the inside radial portion of a preform (at least on the innermost 10% radial distance of the portion of the preform corresponding to the outer cladding 106) and 1.0 to 1.9 g/cm$^3$ on the outside radial portion of a preform (at least on the outer 10% radial distance of the preform that corresponds to at least a part of the fiber's outer cladding 106). For example, in some embodiments it is preferred to have an average density of about 0.3 to 0.7 g/cm$^3$ on the at least inside radial portion of a preform corresponding to the fiber's first outer cladding portion 106A and average density of about 1.2 to 1.8 g/cm$^3$ on the outer radial portion of a preform corresponding to at least an outer region of the second portion 106B of the outer cladding 106. In some embodiments it is preferred to have the average surface area of >15 m$^2$/g on the inside radial portion of a preform (i.e., on the portion 106A) and <10 m$^2$/g on the outer radial portion of a preform. In some embodiments it is preferred to have the average surface area of 15 to 50 m$^2$/g on the inside radial portion of a preform (preform corresponding to the fiber's first outer cladding portion 106A) and 0.2 to 10 m$^2$/g on the outside radial portion of a preform (at least the region of the outer most 10% radial distance that corresponds to the fiber's second outer cladding portion 106B). In some embodiments it is preferred to have a surface area of 15 to 50 m$^2$/g on the inside radial portion of a preform and 0.5 to 5 m$^2$/g on the outside radial portion of a preform. Following the doping step, the doped soot preform is heated to >1400° C. to fully densify the preform, resulting in a preform that comprises a doping profile which shows higher dopant on the inner portion of the preform than the outer portion of the preform (e.g., the dopant concentration would be higher on the portion of the preform corresponding to the first outer cladding portion 106A than the dopant concentration in the part of the preform corresponding to the fiber's second outer cladding portion 106B).

Figure 4B:
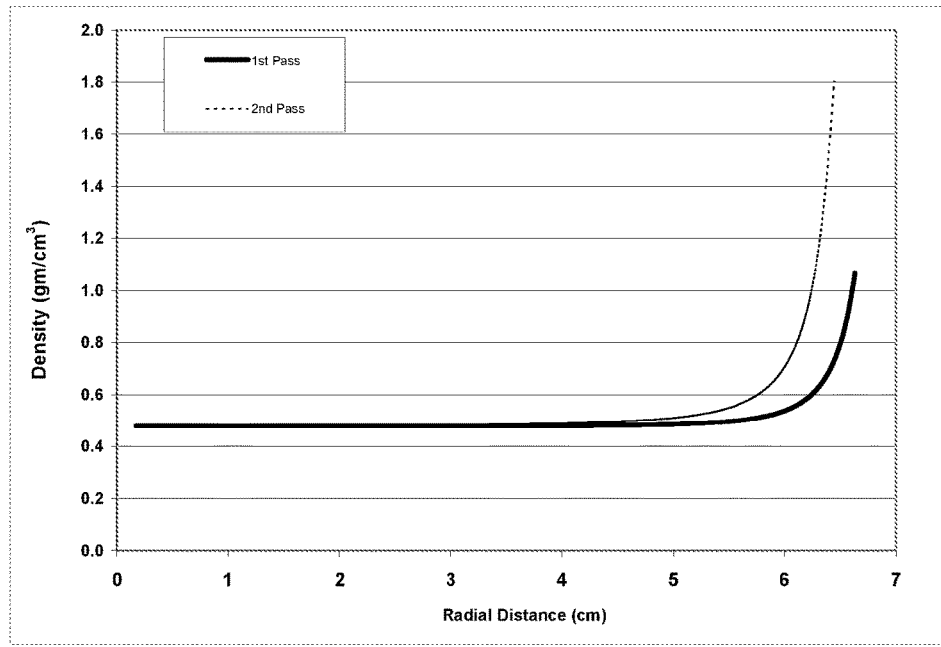
FIG. 4B illustrates densification of the outer portion of a 6500 g silica soot preform after two traverse passes of the preform through a hot zone.

A second example fiber preform embodiment was manufactured by densification of the outer portion of a 6500 g silica soot preform after two traverse passes of the soot preform (having an initial density of 0.45 g/cm$^3$) through a hot zone having peak temperature of 1500° C., with the heating rate of 25° C./min from 1000° C. More specifically, results for this example are shown in FIG. 4B where this figure illustrates the evolution of density of a preform outer cladding layer that had an initial density of 0.45 g/cm$^3$ and initial temperature of 1000° C. as it is traversed two times through a hot zone with peak temperature of 1500° C. at a traverse speed of 50 mm/min (corresponding to heating rate of 25° C./min), resulting in the outer portion (10 outer most % of the preform, or the radial distance of 0.9$r_p$ to $r_p$ where $r_p$ is the outer most radius of the preform) having average glass or soot density of about 1.7 to 1.8 g/cm$^3$ while the inner portion of this preform corresponding to the first portion of the outer cladding remained at an average glass or soot density of about 0.45 g/cm$^3$. Because of the increased density on the outer region of the outer clad's layer 106$_P$ of the preform, the surface area in this region (106B$_P$) was significantly lower than that of the inner portion of the perform (e.g., lower than that of the layer 106A$_P$). After the end of the partial-densification step, the preform (and thus the outer cladding region) was exposed to chlorine precursor (e.g., Cl$_2$ in He) and was subsequently consolidated. In this example, the outer part of the outer clad layer 106B$_P$ was therefore doped with lower amount of chlorine due to the lower surface area in this region during the doping step than the inner part of the preform (layers 104$_P$ and 106A$_P$). An optical fiber was drawn from this preform and the fiber profile obtained by such a process is shown in FIG. 2B.

Figure 4C:
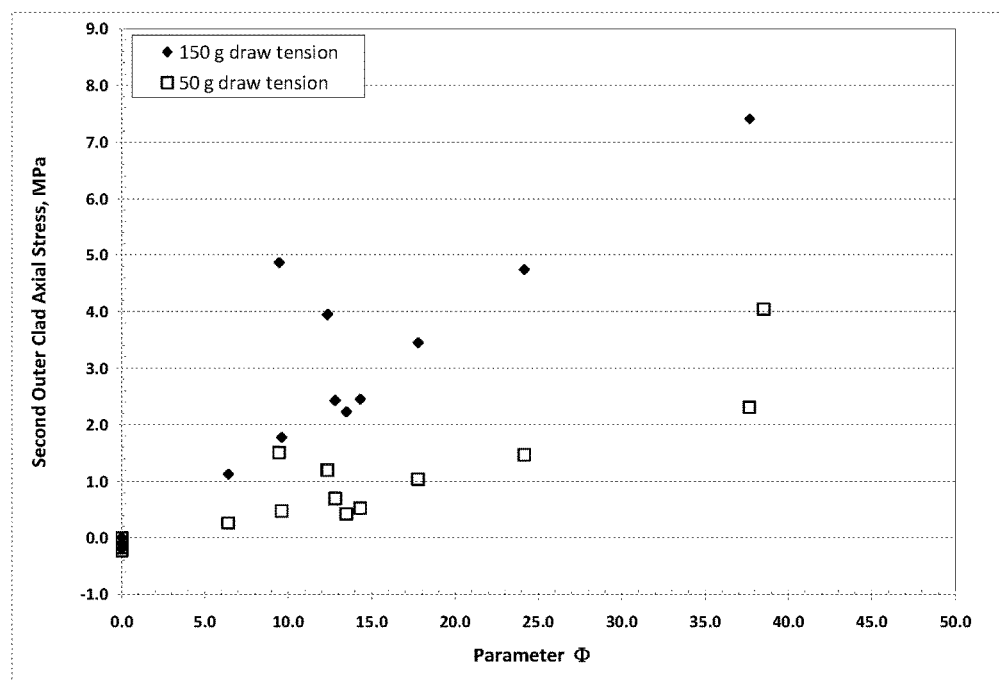
FIG. 4C graphically depicts axial stress in the second outer cladding portion as a function of stress relieving parameter Φ of optical fibers embodiments drawn at two different tensions.

FIG. 4C illustrates axial stress in the second outer cladding layer 106B as a function of stress relieving parameter Φ of optical fiber embodiments drawn at two different tensions. The three comparative examples (Comp. 1, 2 and 3) in Tables 1A-1F are also plotted. These comparative examples only have a first outer cladding layer which goes to the outer edge of the fiber (i.e., they do not have a second outer cladding layer) and the axial compression shown in these plots and tables is the first outer cladding layer. The results show the optical fiber embodiments 100 having a stress relieving parameter Φ≥5 correspond to the second outer cladding 106B in axial tension having an axial stress of ≥0.3 MPa at 50 g draw tension and ≥1 at 150 g draw tension, thus the second cladding layer with Φ≥5 enables lower optical fiber attenuation as described above. However, the fiber 100 can be drawn at a tension of 20-400 g$_f$ (i.e., at a 20-400 g draw tension).

A number of examples of fiber embodiments 100 disclosed in Tables 1 and 2 are ITU G.652 and G.654 standards compliant. The fibers in Tables 1 and 2 have low attenuation at 1550 nm of ≤0.19 dB/km, in some embodiments fiber attenuation is ≤0.185 dB/km, in some other embodiments ≤0.18 dB/km, in still some other embodiments ≤0.17 dB/km.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A single mode optical fiber comprising:
   a core comprising silica and less than or equal to about 11 weight % germania and having a maximum relative refractive index $\Delta_{1\ MAX}$;
   an inner cladding surrounding the core and having a minimum relative refractive index $\Delta_2$ such that $\Delta_{1\ MAX} > \Delta_2$;
   an outer cladding surrounding the inner cladding and comprising a first outer cladding portion and a second outer cladding portion surrounding the first outer cladding portion;
   wherein the viscosity at 1650° C. of the second outer cladding portion minus the viscosity at 1650° C. of the first outer cladding portion is: (i) ≥5×10$^6$ Poise; or (ii) ≥1×10$^6$ Poise and ≤1.6×10$^8$ Poise.

2. The single mode optical fiber of claim 1, wherein the first outer cladding portion has a softening point, $T_{soft-1}$, and the second outer cladding portion has a softening point, $T_{soft-2}$; and the difference between the glass softening point of the second outer cladding portion, $T_{soft-2}$, and the glass softening point of the first cladding outer cladding portion, $T_{soft-1}$, is greater than 2° C.

3. The single mode optical fiber of claim 1, where the first outer cladding portion has a softening point, $T_{soft-1}$, and the second outer cladding portion has a softening point, $T_{soft-2}$; and the difference between the glass softening point of the second outer cladding portion, $T_{soft-2}$, and the glass softening point of the first cladding outer cladding portion, $T_{soft-1}$, is greater than 7° C.

4. The single mode optical fiber of claim 1, wherein at least one of the following is satisfied: (i) the core comprises from greater than or equal to about 2.0 weight % germania; or (ii) the core has a maximum relative refractive index, $\Delta_{1MAX}$, from greater than or equal to about 0.13% to less than or equal to about 0.52%; or (iii) $-0.02\% \leq \Delta_2 \leq 0.02\%$.

5. The single mode optical fiber of claim 1, wherein the core has a radial thickness from greater than or equal to about 3 microns to less than or equal to about 10 microns.

6. The single mode optical fiber of claim 5, wherein the inner cladding has a radial thickness from greater than or equal to about 5 microns.

7. The single mode optical fiber of claim 1, wherein the first outer cladding portion surrounds the inner cladding, the first outer cladding portion comprises chlorine doped silica, the first outer cladding portion has a relative refractive index $\Delta_{3A}$, and $\Delta_{3A} > \Delta_2$.

8. The single mode optical fiber of claim 1, wherein the second outer cladding portion is surrounding the first outer cladding portion, the first outer cladding portion comprises chlorine doped silica and has a relative refractive index $\Delta_{3A}$, the second outer cladding portion comprises chlorine doped silica, silica or SiON, and $\Delta_{3A} > \Delta_2$.

9. The single mode fiber of claim 1, wherein the core comprises from greater than or equal to about 2.0 weight % germania, and wherein:

(i) the second outer cladding portion comprises at least 1000 ppm by weight less chlorine than the first outer cladding portion; or (ii) the first outer cladding portion has an average chlorine concentration between 2000-20000 ppm by weight; or (iii) the second outer cladding portion has a chlorine concentration between 0-6000 ppm by weight, and wherein the second outer cladding portion comprises at least 1000 ppm by weight less chlorine than the first outer cladding portion.

10. The single mode optical fiber of claim 1, wherein the core comprises from greater than or equal to about 2.0 weight % germania and the second outer cladding portion has a radial thickness from greater than or equal to about 2 microns to less than or equal to about 25 microns.

11. The single mode optical fiber of claim 1, wherein the single mode optical fiber has an attenuation of less than or equal to about 0.185 dB/km at a wavelength of 1550 nm.

12. The single mode optical fiber of claim 1, having a normalized stress relieving parameter $\Phi$, where $\Phi \geq 5$.

13. The single mode optical fiber of claim 1, having a normalized stress relieving parameter $\Phi$, where $100 \geq \Phi \geq 5$.

14. The single mode optical fiber of claim 1, wherein the second outer cladding portion is in tension, the tension producing an axial stress of greater than 0.3 MPa, and preferably greater than 2 MPa.

* * * * *

UNITED STATES PATENT AND TRADEMARK OFFICE
CERTIFICATE OF CORRECTION

PATENT NO. : 9,772,445 B2
APPLICATION NO. : 15/091852
DATED : September 26, 2017
INVENTOR(S) : Dana Craig Bookbinder et al.

It is certified that error appears in the above-identified patent and that said Letters Patent is hereby corrected as shown below:

On the Title Page

In item (56), in Column 2, under "Other Publications", Line 1, delete ""Singe" and insert -- "Single --.

On the Page 2, item (56), in Column 2, under "Other Publications", Line 2, delete "02632.5" and insert -- 026325 --.

In the Claims

In Column 30, Line 52, in Claim 1, delete "$\Delta_{1\ MAX}$;" and insert -- $\Delta_{1MAX}$; --.

In Column 30, Lines 54-55, in Claim 1, delete "$\Delta_{1\ MAX} > \Delta_2$;" and insert -- $\Delta_{1MAX} > \Delta_2$; --.

Signed and Sealed this
Ninth Day of January, 2024

*Katherine Kelly Vidal*
*Director of the United States Patent and Trademark Office*